(12) United States Patent
Kudo et al.

(10) Patent No.: US 12,515,460 B2
(45) Date of Patent: Jan. 6, 2026

(54) POLYGON MIRROR

(71) Applicant: CANON KABUSHIKI KAISHA, Tokyo (JP)

(72) Inventors: Genichiro Kudo, Tochigi (JP); Takahito Chibana, Tochigi (JP); Seiji Kuwabara, Tochigi (JP); Junzo Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 455 days.

(21) Appl. No.: 17/568,323

(22) Filed: Jan. 4, 2022

(65) Prior Publication Data

US 2022/0234363 A1    Jul. 28, 2022

(30) Foreign Application Priority Data

Jan. 22, 2021  (JP) ................. 2021-008460

(51) Int. Cl.
*B41J 2/44*      (2006.01)
*B41J 2/45*      (2006.01)
(Continued)

(52) U.S. Cl.
CPC ............. *B41J 2/471* (2013.01); *B41J 2/442* (2013.01); *B41J 2/451* (2013.01); *B41J 2/455* (2013.01);
(Continued)

(58) Field of Classification Search
CPC ... B41J 2/442; B41J 2/451; B41J 2/455; B41J 2/471; G02B 26/0816; G02B 26/106; G02B 26/123; G02B 26/129
See application file for complete search history.

(56) References Cited

U.S. PATENT DOCUMENTS 9,658,449 B2   5/2017 Kudo
2001/0024323 A1* 9/2001 Yanagi ............... G02B 5/09
                                                  359/850
(Continued)

FOREIGN PATENT DOCUMENTS

JP    S62134618 A   6/1987
JP    H10-170708 A  6/1998
(Continued)

OTHER PUBLICATIONS

Notice of Reasons for Refusal issued by the Japanese Patent Office on Aug. 6, 2024 in corresponding JP Patent Application No. 2021-008460, with English translation.

*Primary Examiner* — Douglas X Rodriguez
*Assistant Examiner* — Kendrick X Liu
(74) *Attorney, Agent, or Firm* — Carter, DeLuca & Farrell LLP

(57) ABSTRACT

In order to provide a polygon mirror which can reduce a light amount difference among respective image heights on a scanned surface with suppressing an increase in size in a light scanning apparatus, the polygon mirror according to the present invention includes a plurality of rectangular reflecting surfaces in which the following condition is satisfied:

$$0.02 < |1 - B/A| < 0.10$$

where A represents a reflectivity at a center of the reflecting surface with respect to a light flux which is incident at a predetermined incident angle, and B represents the reflectivity at a predetermined point between the center and an end in the longitudinal direction of the reflecting surface with respect to the light flux which is incident at the predetermined incident angle.

21 Claims, 18 Drawing Sheets

(51) Int. Cl.
*B41J 2/455* (2006.01)
*B41J 2/47* (2006.01)
*G02B 26/08* (2006.01)
*G02B 26/10* (2006.01)
*G02B 26/12* (2006.01)
*G02B 5/09* (2006.01)

(52) U.S. Cl.
CPC ....... *G02B 26/0816* (2013.01); *G02B 26/106* (2013.01); *G02B 26/121* (2013.01); *G02B 26/123* (2013.01); *G02B 26/129* (2013.01); *G02B 5/09* (2013.01)

(56) References Cited

U.S. PATENT DOCUMENTS

| | | | |
|---|---|---|---|
| 2004/0145791 A1* | 7/2004 | Tamaru | G02B 5/09 |
| | | | 359/216.1 |
| 2005/0231779 A1* | 10/2005 | Sowa | G02B 26/124 |
| | | | 347/261 |
| 2008/0018973 A1 | 1/2008 | Cho | |
| 2015/0205097 A1* | 7/2015 | Kudo | G03G 15/043 |
| | | | 359/204.1 |

FOREIGN PATENT DOCUMENTS

| | | |
|---|---|---|
| JP | H11-264952 A | 9/1999 |
| JP | 2001-242312 A | 9/2001 |
| JP | 2005338730 A * | 12/2005 |

\* cited by examiner

POLYGON MIRROR

BACKGROUND OF THE INVENTION

Field of the Invention

The present invention relates to a polygon mirror and a light scanning apparatus including the polygon mirror, and is suitable for an image forming apparatus such as a laser beam printer, a digital copying machine and a multifunction printer.

Description of the Related Art

In a light scanning apparatus using a polygon mirror rotating for scanning a scanned surface, it is known that light amounts at respective image heights on the scanned surface are different from each other when reflectivities with respect to light fluxes incident on a reflecting surface of the polygon mirror at various incident angles are different from each other.

Japanese Patent Application Laid-Open No. S62-134618 discloses a light scanning apparatus in which a flat mirror having the same reflection characteristics as a reflecting surface of a polygon mirror is arranged between the polygon mirror and a scanned surface, and the flat mirror cancels out a reflectivity difference among respective incident angles, thereby a light amount difference among respective image heights on the scanned surface is reduced.

However, in the light scanning apparatus disclosed in Japanese Patent Application Laid-Open No. S62-134618, a size of the apparatus is increased by providing the flat mirror between the polygon mirror and the scanned surface.

SUMMARY OF THE INVENTION

Accordingly, it is an object of the present invention to provide a polygon mirror which can reduce the light amount difference among respective image heights on the scanned surface with suppressing the increase in size in the light scanning apparatus.

The polygon mirror according to the present invention includes a plurality of rectangular reflecting surfaces in which the following condition is satisfied:

$$0.02 < |1 - B/A| < 0.10$$

where A represents a reflectivity at a center of the reflecting surface with respect to a light flux which is incident at a predetermined incident angle, and B represents the reflectivity at a predetermined point between the center and an end in a longitudinal direction of the reflecting surface with respect to the light flux which is incident at the predetermined incident angle.

Further features of the present invention will become apparent from the following description of exemplary embodiments with reference to the attached drawings.

DESCRIPTION OF THE EMBODIMENTS

Hereinafter, the polygon mirror according to the present invention will be described in detail with reference to accompanying drawings. In order to facilitate understanding of the present invention, the drawings shown below may be drawn in a scale different from an actual scale.

In a light scanning apparatus used in an image forming apparatus such as a laser beam printer and a digital copying machine, a light flux emitted from a light source is guided to deflecting unit by an incident optical system.

Then, the light flux deflected for scanning by the deflecting unit is condensed in a spot shape on a surface of a photosensitive drum arranged at a position of the scanned surface by the imaging optical system, so that the surface of the photosensitive drum is optically scanned by the light flux.

In such light scanning apparatus, the light flux emitted from the light source is converted into a substantially parallel light flux by a collimator lens or the like, and then condensed in a vicinity of a deflecting surface of the deflecting unit by a cylindrical lens to form a line image.

The light flux deflected by the deflecting surface of the deflecting unit is condensed by a scanning lens so as to form a spot on the surface of the photosensitive drum, and then the surface of the photosensitive drum is scanned at a substantially constant speed by rotating the deflecting unit, for example.

Figure 11:
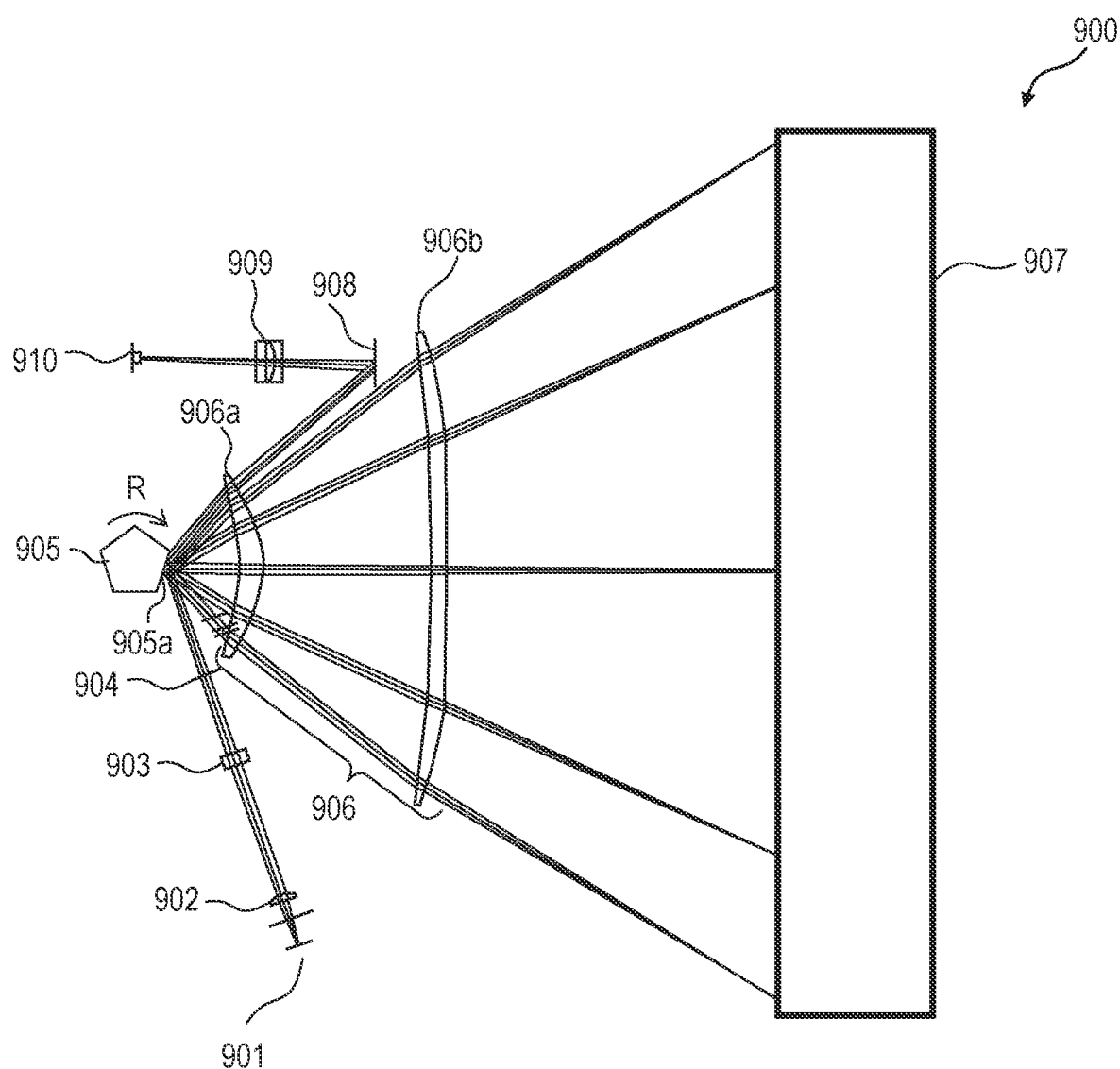
FIG. 11 is a schematic main scanning cross sectional view of a conventional light scanning apparatus.

FIG. 11 shows a schematic main scanning cross sectional view of a conventional light scanning apparatus 900.

In the light scanning apparatus 900, a light source 901 is formed by a semiconductor laser, for example, and a collimator lens 902 converts a diverging light flux emitted from the light source 901 into a substantially parallel light flux.

A cylindrical lens 903 has a predetermined refractive power only in the sub-scanning cross section, and condenses the light flux passing through the collimator lens 902 in the sub-scanning cross section to form a substantially linear image on a deflecting surface (deflecting reflection surface) 905a of a deflecting unit 905.

A stop 904 is a slit member, for example, and regulates a light flux diameter of the light flux passing through the cylindrical lens 903.

The deflecting unit 905 is formed by a polygon mirror (rotating polygon mirror) with a plurality of deflecting surfaces 905a, for example, and rotates in a direction of an arrow R in FIG. 11 by a driving unit (not shown) such as a motor.

An fθ lens group 906 is formed by a first lens group 906a with a refractive power mainly in the main scanning cross section and a second lens group 906b with a refractive power mainly in the sub-scanning cross section.

The fθ lens group 906 guides the light flux deflected by the deflecting unit 905 to form a spot on a scanned surface 907.

Further, the fθ lens group 906 sets a substantially conjugate relationship in the sub-scanning cross section between the deflecting surface 905a and the scanned surface 907, thereby a shift of an imaging position caused by a tilt of the deflecting surface 905a is reduced, namely a facet angle error compensation optical system is formed.

The light flux passing through the first lens group 906a after deflected in a predetermined direction by the deflecting unit 905 is reflected by a mirror 908 toward a synchronization detection sensor 910.

Then, a synchronization detection imaging lens 909 condenses the light flux reflected by the mirror 908 on the synchronization detection sensor 910.

In the light scanning apparatus 900 as described above, it is known that a polygon mirror made of a resin is used as the deflecting unit 905.

In the polygon mirror made of the resin, there is such a problem that it is difficult to manufacture it with a high environmental durability and a high quality at a low cost.

That is, in order to manufacture the high quality polygon mirror made of the resin, a high precision molding technique and a high quality film forming technique are required.

In particular, there is a problem in a case that the high quality polygon mirror made of the resin is manufactured at a low cost by using a film formation by a vapor deposition.

That is, when a film is formed on each of a large number of polygon mirrors arranged in a film forming apparatus, it is difficult to stabilize a reflectivity difference among a plurality of deflecting surfaces and a reflectivity distribution in each deflecting surface with securing a film adhesion strength such that reflectivities with respect to light fluxes incident on each deflection point on the deflecting surface become substantially constant among them in the light scanning apparatus in which the polygon mirror is mounted.

As a result of repeated studies as described below, the present inventors have found a method for forming a polygon mirror with a high mass productivity, a low cost and a high quality by solving the above-described problems.

Thereby, and the polygon mirror for light scanning apparatus with a high definition having a simple film configuration which can be formed by the film forming apparatus with suppressing a generation of a light amount distribution on the scanned surface without using a folding mirror in the light scanning apparatus in which the polygon mirror is mounted, can be provided at a low cost.

First Embodiment

Figure 1:
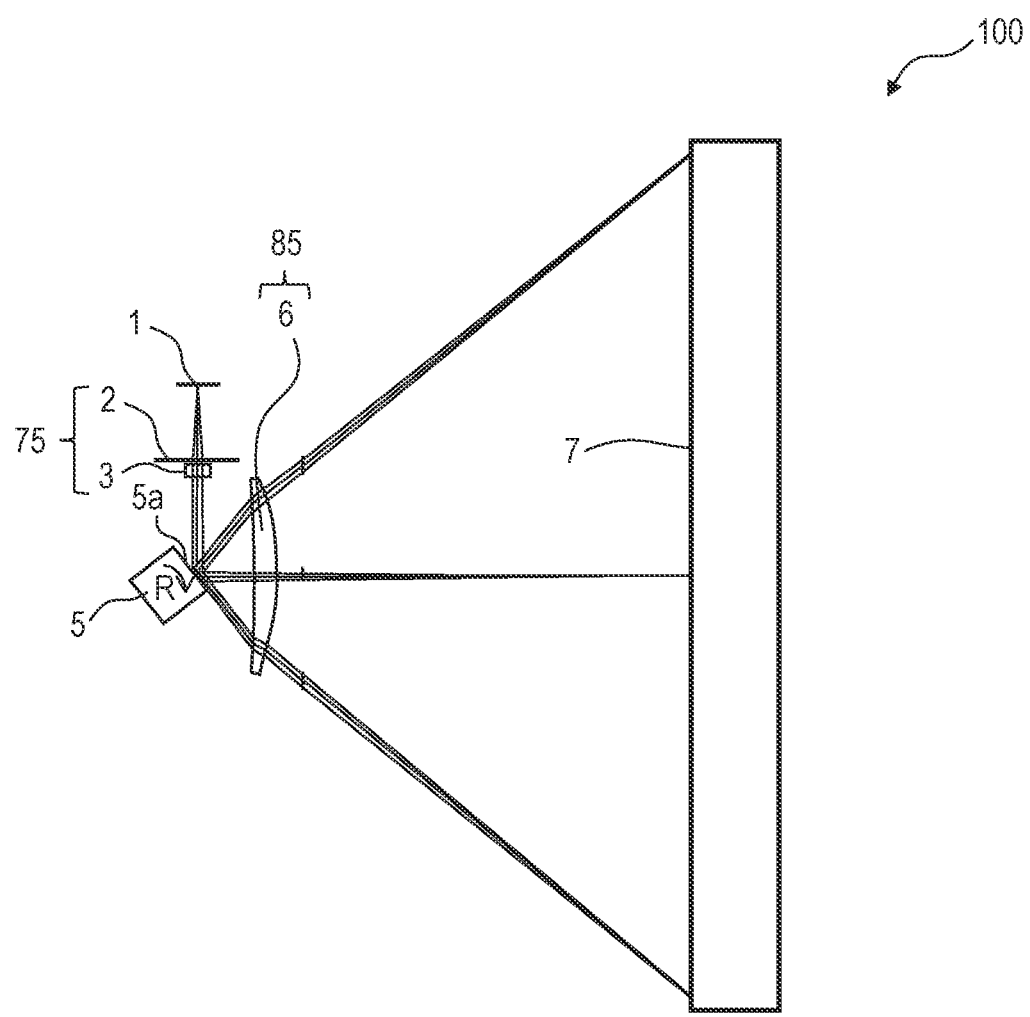
FIG. 1 is a schematic main scanning cross sectional view of the light scanning apparatus including the polygon mirror according to the present invention.

FIG. 1 shows a schematic main scanning cross sectional view of a light scanning apparatus 100 including a polygon mirror 5 according to a first embodiment of the present invention.

The light scanning apparatus 100 includes a light source 1, a stop 2, an anamorphic collimator lens 3, a deflecting unit 5 and a scanning lens 6. Further, the light scanning apparatus 100 includes a mirror (not shown).

The light source 1 is formed by a semiconductor laser with forty-one light emitting points.

The stop 2 is an aperture stop with an elliptical opening, and regulates light flux widths in the main scanning direction and the sub-scanning direction of a light flux emitted from the light source 1.

The anamorphic collimator lens 3 converts the light flux passing through the stop 2 into a weak convergent light flux in the main scanning direction and a convergent light flux in the sub-scanning direction.

That is, the anamorphic collimator lens 3 is formed by an anamorphic lens with powers different between the main scanning cross section and the sub-scanning cross section.

The anamorphic collimator lens 3 is formed by a plastic molding.

As described above, the stop 2 and the anamorphic collimator lens 3 form an incident optical system 75 in the light scanning apparatus 100.

The deflecting unit 5 is a four-surfaces polygon mirror with a circumscribed circle diameter of 20 mm in the light scanning apparatus 100, and is rotated at a constant speed in the direction of arrow R by a driving unit such as a motor (not shown) to deflect the light flux passing through the incident optical system 75 for scanning. An apparatus including the deflecting unit 5 corresponding to the polygon mirror and the driving unit may also be referred to as a deflecting apparatus.

The scanning lens 6 is an fθ lens with substantially fθ characteristics, and guides the light flux deflected by the deflecting unit 5 on the scanned surface 7 to form a spot on an image area of the scanned surface 7.

The scanning lens 6 sets a substantially conjugate relationship in the sub-scanning cross section between the deflecting surface (reflecting surface) 5a of the deflecting unit 5 or its vicinity and the scanned surface 7 or its vicinity, thereby the facet angle error compensation of the deflecting surface 5a of the deflecting unit 5 is performed.

In the light scanning apparatus 100, the scanning lens 6 forms an imaging optical system 85.

With the structure described above, in the light scanning apparatus 100, when the light flux emitted from the light source 1 with optically modulated according to image information passes through the stop 2, light flux widths in the main scanning direction and the sub-scanning direction are regulated by the opening of the stop 2.

The light flux passing through the stop 2 is converted by the anamorphic collimator lens 3 so as to have different convergences between the main scanning cross section and the sub-scanning cross section, and condensed so as to form an image of a substantially focal line (a long line image in the main scanning direction) on the deflecting surface 5a of the deflecting unit 5.

The light flux deflected by the deflecting surface 5a of the deflecting unit 5 is condensed on the scanned surface 7 in a spot shape by the scanning lens 6, and the scanned surface 7 is optically scanned at a substantially constant speed in the main scanning direction by rotating the deflecting unit 5 in the direction of arrow R.

Thereby, image recording is performed on the surface of the photosensitive drum as a recording medium arranged at the position of the scanned surface 7.

When the scanned surface 7 is optically scanned, it is necessary to determine a timing for starting the scan on the scanned surface 7.

Therefore, a light flux deflected in a predetermined direction by the deflecting unit 5 is guided on a beam detection (BD) sensor (not shown) by a BD lens (not shown) in the light scanning apparatus 100.

Then, a control unit (not shown) uses a synchronization signal (BD signal) obtained by detecting an output signal from the BD sensor to determine the light emission timing of the light emitting point of the light source 1 for starting the scan in image recording on the scanned surface 7.

Next, the structure of the polygon mirror 5 according to the present invention will be described.

The polygon mirror 5 according to the present invention used as the deflecting unit 5 in the light scanning apparatus 100 is formed by injection molding with a plastic material (specifically, K22R manufactured by Zeon Corporation, for example).

Thereby, the reflecting surface 5a of the polygon mirror 5 according to the present invention can be formed with a high accuracy and at a low cost.

The film formation on the reflecting surface 5a of the polygon mirror 5 according to the present invention is performed by a vacuum vapor deposition. Thereby, a processing cost for the film formation per capita can be suppressed since the film formation can be simultaneously performed on each of a large number of polygon mirrors 5 at once.

Further, since a commercially available general-purpose vapor deposition apparatus can be used, an investment can be suppressed.

Figure 2A:
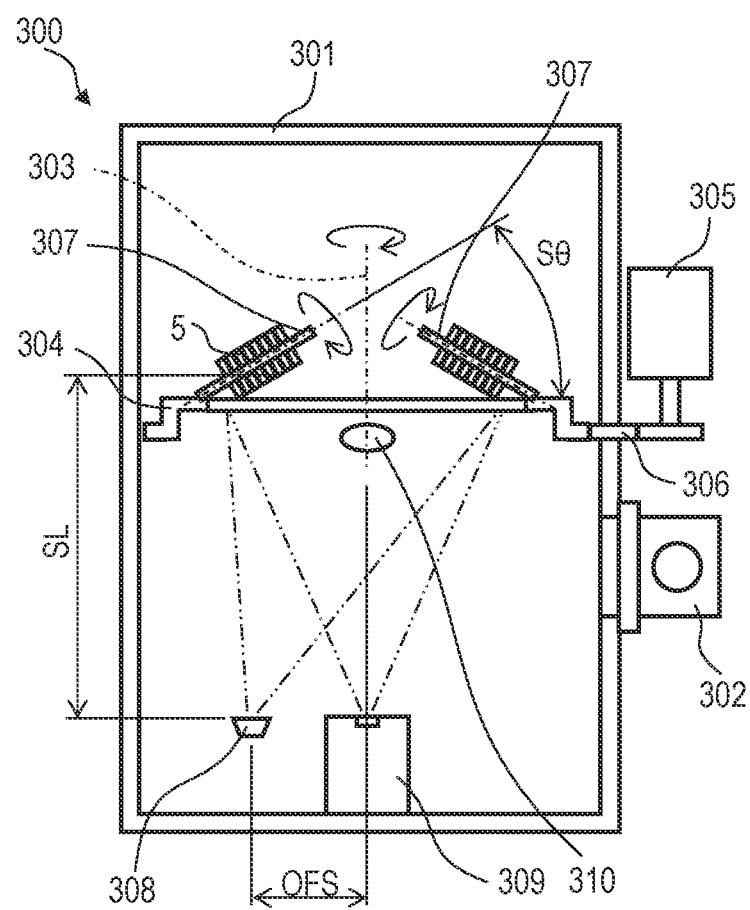
FIG. 2A is a schematic diagram of a vacuum vapor deposition apparatus for forming a film on the polygon mirror according to the present invention.
Figure 2B:
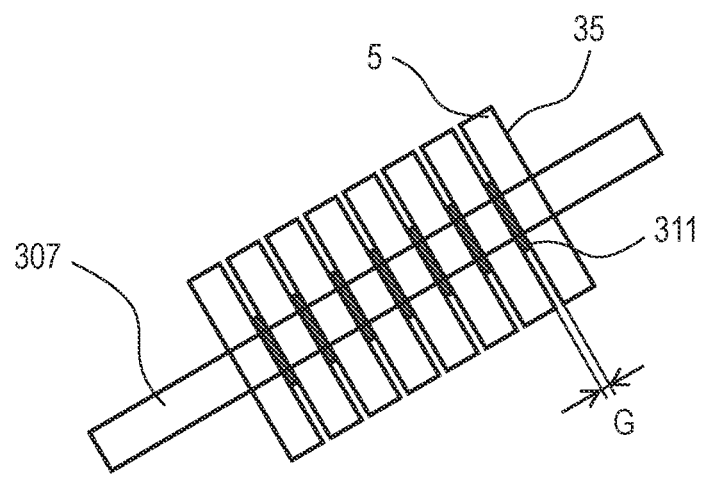
FIG. 2B is a schematic diagram of the vacuum vapor deposition apparatus for forming a film on the polygon mirror according to the present invention.

FIGS. 2A and 2B show a schematic cross-sectional view and a schematic partially enlarged cross-sectional view of a vacuum vapor deposition apparatus 300 for forming a film on the reflecting surface 5a of the polygon mirror 5 according to the present invention, respectively.

The vacuum vapor deposition apparatus 300 is provided with a film forming chamber 301 capable of maintaining an inside in a vacuum state, and an exhausting system 302 formed by a vacuum pump or the like for exhausting the film forming chamber 301.

In the film forming chamber 301, a revolution component 304 capable of revolution driving around a revolution axis 303 is arranged, and the revolution driving of the revolution component 304 is performed by a driving mechanism 305 via a gear 306.

A plurality of polygon mirrors 5 are arranged with laminated such that a rotation component 307 provided in the film forming chamber 301 penetrates a hole formed at a center of each of them.

Then, the rotation component 307 in which the plurality of polygon mirrors 5 are arranged as described above is disposed with inclined so as to form an angle $S\theta$ with respect to the revolution component 304, and the rotation driving of the rotation component 307 is performed by a driving mechanism (not shown).

As described above, by revolution driving the revolution component 304 and rotation driving the rotation component 307, the film is formed on the reflecting surface 5a in the state where the polygon mirror 5 performs the rotation and the revolution.

The vacuum vapor deposition apparatus 300 is provided with a liner 308, an ion gun 309 and a quartz film thickness sensor 310.

Further, an argon introduction line (not shown) and an oxygen introduction line (not shown) for introducing oxygen gas are provided in the film forming chamber 301.

The liner 308 is arranged at a position separated from the revolution axis 303 by a distance OFS and the polygon mirror 5 by a height SL.

As shown in FIG. 2B, the plurality of polygon mirrors 5 are arranged along the axial direction of the rotation component 307 such that a surface 35 perpendicular to the plurality of reflecting surfaces 5a faces upward and they are spaced apart from each other by a gap G through a spacer 311.

In the vacuum vapor deposition apparatus 300, the gap G is formed by using the spacer 311, but the present invention is not limited to this, and may be formed by providing a step portion in the polygon mirror 5. In this case, the number of components can be reduced since the spacer 311 is not needed.

Figure 2C:
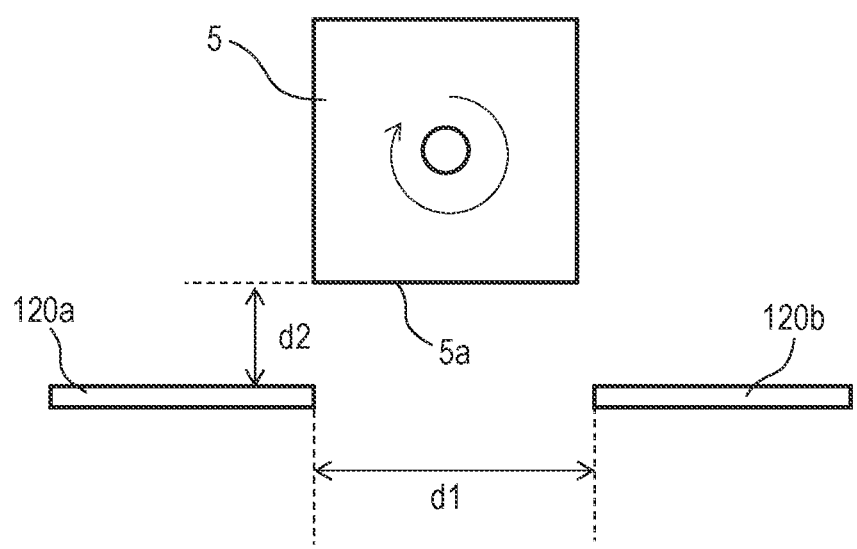
FIG. 2C is a schematic diagram of the vacuum vapor deposition apparatus for forming a film on the polygon mirror according to the present invention.

FIG. 2C shows a front view in an axial direction of the polygon mirror 5 attached to the rotation component 307 in the vacuum vapor deposition apparatus 300.

As shown in FIG. 2C, shielding plates 120a and 120b in a slit shape are provided such that they are spaced apart from each other by an interval d1 between the polygon mirror 5 and the liner 308.

Further, the shielding plates 120a and 120b are arranged such that they are spaced apart from the polygon mirror 5 by a distance d2 in a direction perpendicular to the reflecting surface 5a of the polygon mirror 5 which they face in the film forming chamber 301.

In addition, the positional relationship between the rotation component 307, and the shielding plates 120a and 120b is not changed during the film formation.

In the vacuum vapor deposition apparatus 300, shielding plates 120a and 120b are provided in order to suppress a formation of a so-called oblique incidence film in which vapor deposition particles are deposited at a large incident angle with respect to the reflecting surface 5a of the polygon mirror 5.

If the oblique incidence film is formed on the reflecting surface 5a of the polygon mirror 5, a film density becomes small, so that a corrosion of a metal film advances in an atmosphere to reduce an environmental durability.

Therefore, the formation of the oblique incidence film can be suppressed by reducing the distance d1 and increasing the distance d2, and a reflection film with the high environmental durability can be formed on the reflecting surface 5a of the polygon mirror 5.

On the other hand, when the distance d1 is reduced and the distance d2 is increased as described above, the more deposited particles are shielded toward an end of the reflecting surface 5a of the polygon mirror 5 in the longitudinal direction.

Therefore, a physical film thickness of the reflection film formed on the reflecting surface 5a becomes thinner toward the end in the longitudinal direction, so that a distribution of the physical film thickness of the reflection film is generated in the longitudinal direction.

Then, the distribution of the physical film thickness of the reflection film generated in the longitudinal direction generates a reflectivity distribution on the reflecting surface 5a of the polygon mirror 5, so that light amounts at respective image heights on the scanned surface 7 are not uniform among them by mounting such polygon mirror 5 in the light scanning apparatus 100.

That is, it is difficult to achieve both of the environmental durability on the reflecting surface 5a of the polygon mirror 5 and the uniformity of the light amount distribution on the scanned surface 7 in the conventional inexpensive processing method as described above.

As a result of intensive studies, the present inventors have found a film structure for forming the reflecting surface 5a with the high environmental durability and the high quality as shown below, and a method for processing the polygon mirror 5 having such reflecting surface 5a.

Specifically, when the polygon mirror 5 according to the present invention is processed, a multilayer film is formed on the reflecting surface 5a, of the polygon mirror 5 with setting the interval d1 and the distance d2 to 16 mm and 5 mm, respectively, in order to secure the environmental durability by suppressing the formation of the oblique incidence film on the reflecting surface 5a.

Figure 3:
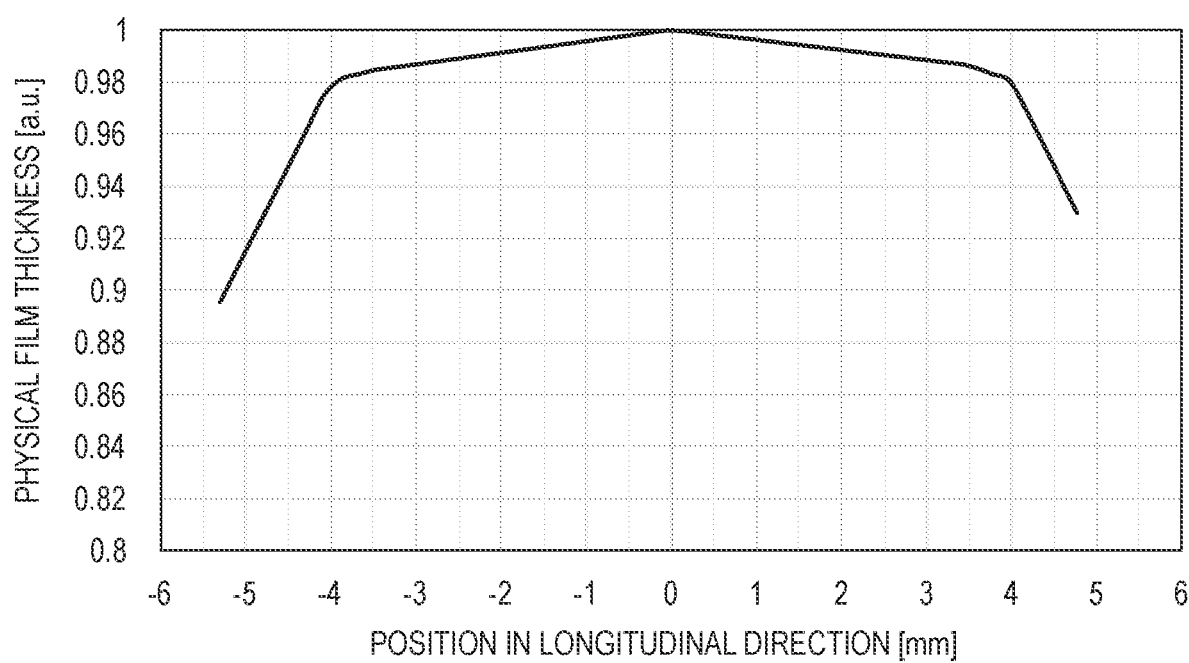
FIG. 3 is a graph showing a position dependence in a longitudinal direction of a physical film thickness on a reflecting surface of the polygon mirror according to a first embodiment of the present invention.

FIG. 3 shows a distribution of the physical film thickness of the multilayer film on the reflecting surface 5a of the polygon mirror 5 on which the multilayer film is formed in this manner, specifically a position dependence in the longitudinal direction of the physical film thickness of the multilayer film on the reflecting surface 5a.

With respect to the arrangement of the shielding plates 120a and 120b, the polygon mirror 5 having the same high environmental durability on the reflecting surface 5a has been obtained as long as the interval d1 is between 14 mm and 20 mm, and the distance d2 is between 0 mm and 10 mm.

In FIG. 3, the physical film thickness of the multilayer film on the reflecting surface 5a is normalized such that the physical film thickness at the center (0 mm) in the longitudinal direction is 1.

As film materials of the multilayer film on the reflecting surface 5a of the polygon mirror 5 according to the present invention, a metal material Al, a low refractive index material $SiO_2$ and a high refractive index material $Ta_2O_5$ are used, but the present invention is not limited thereto.

When the multilayer film is formed on the reflecting surface 5a, a pressure in the film forming chamber 301 is reduced to $1.3 \times 10^{-2}$ Pa by the exhaustion of the exhausting system 302, and then the above-described materials are deposited on the reflecting surface 5a by the liner 308.

The film forming speed is controlled by the quartz film thickness sensor 310, and specifically is set to 2.5 nm/sec, 1.6 nm/sec and 0.4 nm/sec for the metal material Al, the low refractive index material $SiO_2$ and the high refractive index material $Ta_2O_5$, respectively.

When the film is formed with respect to the low refractive index material $SiO_2$ and the high refractive index material $Ta_2O_5$, ion assisting is performed by the ion gun 309.

Next, the physical film thickness of each layer of the multilayer film at the center (0 mm) in the longitudinal direction on the reflecting surface 5a of the polygon mirror 5 according to the present embodiment is shown in the following Table 1.

In the multilayer film formed on the reflecting surface 5a of the polygon mirror 5 according to the present embodiment, a layer of the low refractive index material $SiO_2$ is provided between the substrate and the first layer as a ground layer (adhesion layer), but is omitted here.

TABLE 1

|  |  | Film material | Physical film thickness [nm] |
|---|---|---|---|
| Protecting layer | Fourth layer | $SiO_2$ | 165 |
| Reflecting layer | Third layer | $Ta_2O_5$ | 63.5 |
|  | Second layer | $SiO_2$ | 160 |
|  | First layer | Al | 100 |
|  | Substrate | K22R |  |

As shown in Table 1, on the reflecting surface 5a of the polygon mirror 5 according to the present embodiment, the multilayer film is formed such that a first layer formed of the metal material Al, a second layer formed of the low refractive index material $SiO_2$, a third layer formed of the high refractive index material $Ta_2O_5$ and a fourth layer formed of the low refractive index material $SiO_2$ are laminated in this order on a substrate formed of a resin (K22R manufactured by Zeon Corporation).

The first to third layers form a reflecting layer, and the fourth layer forms a protecting layer.

That is, the reflecting surface 5a of the polygon mirror 5 according to the present embodiment has the multilayer film in which three or more layers including the ground layer, the reflecting layer and the protecting layer are laminated.

The physical film thickness of each layer shown in Table 1 indicates a thickness of the film formed on each layer.

In the polygon mirror 5 according to the present embodiment, the physical film thickness of each layer of the multilayer film on the reflecting surface 5a is set such that it is different to make the reflectivity of the multilayer film different between the vicinity of the center and the vicinity of the end in the longitudinal direction.

Figure 4:
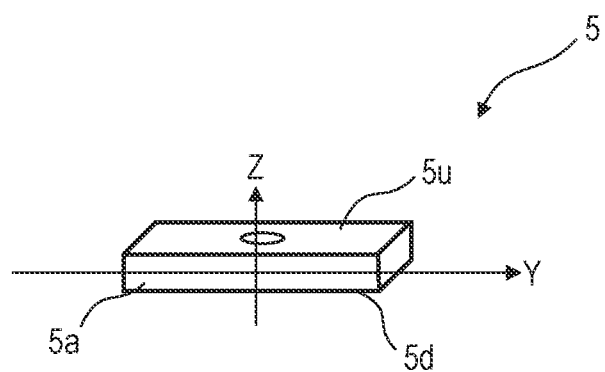
FIG. 4 is a schematic perspective view of the polygon mirror according to the present invention.

FIG. 4 shows a schematic perspective view of the polygon mirror 5 according to the present invention.

As shown in FIG. 4, the polygon mirror 5 includes four rectangular reflecting surfaces 5a for reflecting (deflecting) a light flux, an upper surface 5u and a lower surface 5d both of which are perpendicular to the reflecting surfaces 5a.

Here, the longitudinal direction and the lateral direction of the reflecting surface 5a are conveniently referred to as a Y direction (Y axis) and a Z direction (Z axis), respectively, and the center of the reflecting surface 5a is set to an origin with respect to the Y direction and the Z direction.

Figure 5:
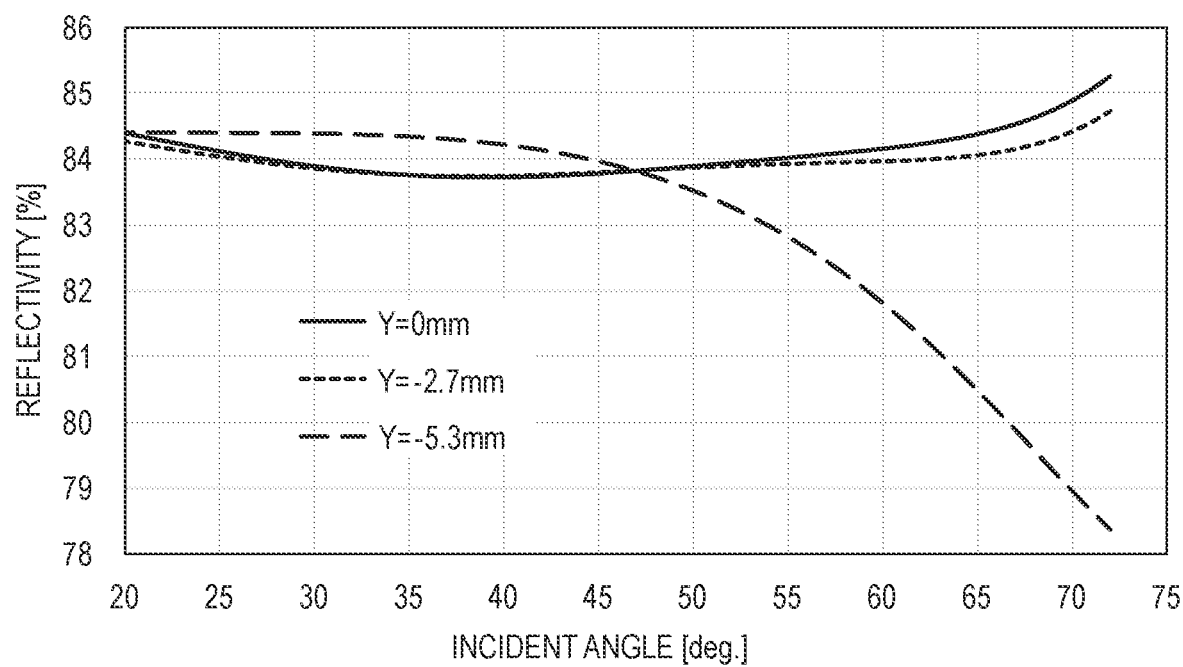
FIG. 5 is a graph showing an incident angle dependence of a reflectivity on the reflecting surface of the polygon mirror according to the first embodiment of the present invention.

FIG. 5 shows an incident angle dependence of the reflectivity on the reflecting surface 5a of the polygon mirror 5 according to the present embodiment.

The incident angle herein is an angle formed by an incident direction of a light flux which is incident on the reflecting surface 5a of the polygon mirror 5 with respect to the normal of the reflecting surface 5a in the main scanning cross section (in a plane parallel to the normal and the longitudinal direction of the reflecting surface 5a) in the light scanning apparatus 100 in which the polygon mirror 5 is mounted.

The incident angle dependence of the reflectivity is shown at respective positions of Y=0 mm, Y=−5.3 mm and Y=−2.7 mm.

Here, the position of Y=0 mm corresponds to the center in the longitudinal direction of the reflecting surface 5a.

Figure 6:
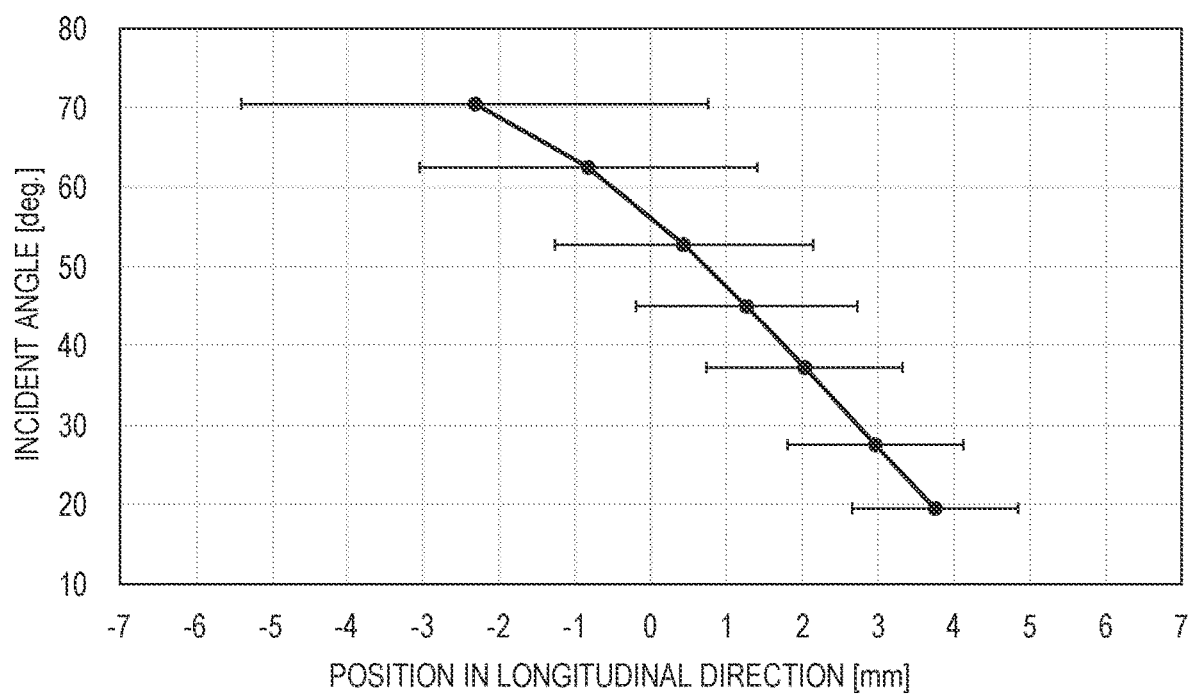
FIG. 6 is a graph showing a position dependence in the longitudinal direction of the incident angle of a light flux on the reflecting surface of the polygon mirror according to the present invention.

Further, as shown in FIG. 6, the position of Y=−5.3 mm corresponds to a reflection point (hereinafter, referred to as an outermost off-axis reflection point) on the reflecting surface 5a for reflecting a marginal ray at a writing end side (scanning end side) of a light flux (hereinafter, referred to as an outermost off-axis light flux) toward an outermost off-axis image height at the writing end side. In other words, the position of Y=−5.3 mm is the reflection point of the marginal ray of the outermost off-axis light flux most distant from the center (Y=0 mm) in the longitudinal direction, as shown in FIG. 6.

The position of Y=−2.7 mm corresponds to the reflection point located at a substantially intermediate position between the above-described two points in the longitudinal direction.

The incident light flux herein is P-polarized and has a wavelength of 790 nm.

As shown in FIG. 3, the physical film thickness of the multilayer film on the reflecting surface 5a is symmetric between a positive side and a negative side in the longitudinal direction in the polygon mirror 5 according to the present embodiment.

That is, the incidence angle dependence of the reflectivity at a position at the negative side can be used as it is for the incidence angle dependence of the reflectivity at a corresponding position at the positive side of the reflecting surface 5a.

Accordingly, only the incidence angle dependences of the reflectivity at positions of from Y=0 mm to the negative side in the longitudinal direction is shown in FIG. 5.

That is, the change between the center and one end in the longitudinal direction of the reflectivity with respect to the light flux which is incident on the reflecting surface 5a is identical to the change between the center and the other end in the longitudinal direction of it in the polygon mirror 5 according to the present embodiment.

As shown in FIG. 5, the polygon mirror 5 according to the present embodiment is configured such that the incidence angle dependences of the reflectivity at the center (Y=0 mm) of the reflecting surface 5a is different from that at the outermost off-axis reflection point (Y=−5.3 mm) on the reflecting surface 5a.

This is achieved by making the physical film thickness of each layer of the multilayer film at the center (Y=0 mm) of the reflecting surface 5a of the polygon mirror 5 shown in Table 1 different from that at the outermost off-axis reflection point (Y=−5.3 mm) on the reflecting surface 5a.

Table 2 shows the physical film thickness of each layer of the multilayer film at the outermost off-axis reflection point (Y=−5.3 mm) on the reflecting surface 5a of the polygon mirror 5 according to the present embodiment.

TABLE 2

|  |  | Film material | Physical film thickness [nm] |
|---|---|---|---|
| Protecting layer | Fourth layer | $SiO_2$ | 149 |
| Reflecting layer | Third layer | $Ta_2O_5$ | 57 |
|  | Second layer | $SiO_2$ | 144 |
|  | First layer | Al | 90 |
|  | Substrate | K22R |  |

As shown in Tables 1 and 2, the physical film thickness of each layer of the multilayer film at the outermost off-axis reflection point (Y=−5.3 mm) is reduced by approximately 10% as compared with that at the center (Y=0 mm) on the reflecting surface 5a of the polygon mirror 5.

Specifically, the structure of the vacuum vapor deposition apparatus 300 is designed such that the physical film thickness of each layer is reduced by approximately 2% at the position of Y=±4 mm and by approximately 9% at the position of Y=±5 mm as compared with that at the center (Y=0 mm) as shown in FIG. 3.

That is, the film thickness of the multilayer film on the reflecting surface 5a decreases from the center to the outermost off-axis reflection point along the longitudinal direction in the polygon mirror 5 according to the present embodiment.

In the polygon mirror 5 according to the present embodiment, the reflectivity at the center (Y=0 mm) of the reflecting surface 5a is smaller than that at the outermost off-axis reflection point (Y=−5.3 mm) on the reflecting surface 5a at the incident angle of 45° as shown in FIG. 5.

On the other hand, the reflectivity at the center (Y=0 mm) of the reflecting surface 5a is larger than that at the outermost off-axis reflection point (Y=−5.3 on the reflecting surface 5a at the incident angle of 70°.

That is, in the polygon mirror 5 according to the present embodiment, the reflectivity with respect to the light flux which is incident on the reflecting surface 5a at the incident angle of 70° (first incident angle) becomes lower from the center toward the outermost off-axis reflection point along the longitudinal direction. On the other hand, the reflectivity with respect to the light flux which is incident on the reflecting surface 5a at the incident angle of 45° (second incident angle) becomes higher from the center toward the outermost off-axis reflection point along the longitudinal direction.

With the above-described structure, light amounts can be made substantially uniform between the light flux deflected toward an image end on the scanned surface 7 and that deflected toward an image center on the scanned surface 7 in the light scanning apparatus 100 in which the polygon mirror 5 according to the present embodiment is mounted.

In the polygon mirror 5 according to the present embodiment, a sum of the physical film thicknesses of respective layers of the multilayer film at the center of the reflecting surface 5a and the sum of the physical film thicknesses of the respective layers of the multilayer film at the outermost off-axis reflection point on the reflecting surface 5a are represented by C and D, respectively.

At this time, the physical film thickness of each layer is reduced from the center toward the outermost off-axis reflection point along the longitudinal direction on the reflecting surface 5a such that the following conditional expression (1) is satisfied in the polygon mirror 5 according to the present embodiment:

$$0.50 < D/C < 0.93 \qquad (1).$$

Specifically, since C=488.5 nm and D=440 nm are calculated from Tables 1 and 2, D/C=0.90 is obtained, so that the conditional expression (1) is satisfied.

Further, it is preferred that the following conditional expression (1a) is satisfied in the polygon mirror 5 according to the present embodiment:

$$0.75 < D/C < 0.93 \qquad (1a).$$

FIG. 6 shows incident angles of the light fluxes which are incident on each position in the longitudinal direction of the reflecting surface 5a in the light scanning apparatus 100 in which the polygon mirror 5 according to the present embodiment is mounted.

Note that error bars shown in FIG. 6 indicate magnitudes of light flux widths of the light fluxes which are incident on the respective positions.

That is, the center (black circle) of the error bar indicates the position on which a principal ray of each light flux is incident, and both ends of the error bar indicate positions on which marginal rays of each light flux are incident.

The deflection point for deflecting the light flux toward the on-axis image height on the scanned surface 7 corresponds to the position of Y=+1.3 mm on the reflecting surface 5a, and the positive side and the negative side relative to this position correspond to a deflection point group for deflecting the light fluxes toward the writing start side (scanning start side) and the writing end side (scanning end side) on the scanned surface 7, respectively.

As shown in FIG. 6, with respect to the light flux deflected toward the image end (outermost off-axis image height) at the writing end side on the scanned surface 7, a principal ray is deflected at the position of Y=−2.2 mm on the reflecting surface 5a of the polygon mirror 5.

Further, marginal rays of the light flux are deflected at the positions of Y=−5.5 mm and Y=+0.9 mm on the reflecting surface 5a of the polygon mirror 5, respectively, and the incident angle of the light flux on the reflecting surface 5a is 70°.

With respect to the light flux deflected toward the image center (on-axis image height) on the scanned surface 7, the incident angle of the light flux on the reflecting surface 5a is 45°, and the light flux is deflected in a position range between Y=−0.2 mm and Y=+2.8 mm on the reflecting surface 5a of the polygon mirror 5.

Similarly, with respect to the light flux deflected toward the image end (outermost off-axis image height) at the writing start side on the scanned surface 7, the incident angle of the light flux on the reflecting surface 5a is 20°, and the light flux is deflected in the position range between Y=+2.7 mm and Y=4.9 mm on the reflecting surface 5a of the polygon mirror 5.

As shown in FIG. 5, the reflectivity with respect to the light flux which is incident at the incident angle of 70° on the reflecting surface 5a of the polygon mirror 5 becomes lower from the center toward the outermost off-axis reflection point along the longitudinal direction in the light scanning apparatus 100 in which the polygon mirror 5 according to the present embodiment is mounted.

Specifically, the reflectivities with respect to the light fluxes which are incident at the incident angle of 70° (predetermined incident angle) on the center and the outermost off-axis reflection point of the reflecting surface 5a of the polygon mirror 5 are represented by A and B, respectively.

At this time, the following conditional expression (2) is satisfied in the polygon mirror 5 according to the present embodiment:

$$0.02 < |1 - B/A| < 0.10 \qquad (2).$$

In the polygon mirror 5 according to the present embodiment, since A=85% and B=79% are obtained from FIG. 5, |1−B/A|=0.07 is obtained, so that the conditional expression (2) is satisfied.

Further, it is preferred that the following conditional expression (2a) is satisfied in the polygon mirror 5 according to the present embodiment:

$$0.05 \le |1 - B/A| \le 0.09 \qquad (2a).$$

By satisfying the conditional expression (2a) in the polygon mirror 5 according to the present embodiment, a degree of freedom in designing the multilayer film on the reflecting surface 5a can be improved, and particularly, a cost reduction can be achieved by reducing the physical film thickness of at least one layer.

As shown in FIG. 5, the film structure is designed such that the conditional expression (2) is satisfied with respect to the light flux which is incident on the reflecting surface 5a with the incident angle of 70°, P-polarized and the wavelength of 790 nm in the polygon mirror 5 according to the present embodiment.

However, the present invention is not limited to this, and the film structure may be designed such that the conditional expression (2) is satisfied also for the light flux which is incident on the reflecting surface 5a at the incident angle of 20° or 45°.

The polygon mirror 5 according to the present embodiment is configured such that the reflectivity with respect to the light flux which is incident on the reflecting surface 5a at the incidence angle of 35° becomes higher from the center toward the outermost off-axis reflection point along the longitudinal direction.

That is, the difference in the reflectivity caused by the difference in the incident angle is canceled out by that caused by the difference in the incident position between the light flux which is incident on the reflecting surface 5a at the incident angle of 45° and that at the incident angle of 20° or 70° in the polygon mirror 5 according to the present embodiment.

As a result, the reflectivity of the reflecting surface 5a can be made substantially uniform between the light flux which is incident on the reflecting surface 5a of the polygon mirror 5 at the incident angle of 45° so as to be deflected toward the image center on the scanned surface 7 and that at the incident angle of 20° or 70° so as to be deflected toward the image end on the scanned surface 7.

As described above, the polygon mirror 5 according to the present embodiment is configured such that the incident angle dependence of the reflectivity at the center of the reflecting surface 5a is different from that at the outermost off-axis reflection point on the reflecting surface 5a, but the present invention is not limited thereto.

That is, when the reflectivity A at the center of the reflecting surface 5a and the reflectivity B at a predetermined point between the center and the end in the longitudinal direction of the reflecting surface 5a with respect to the light flux which is incident on the reflecting surface 5a at a predetermined incident angle satisfy the conditional expression (2), similar effects can be obtained.

Here, when a distance between the center and the end on the reflecting surface 5a is represented by L, and a distance between the center and the above-described predetermined point on the reflecting surface 5a is represented by s, the following conditional expression (3) is satisfied in the polygon mirror 5 according to the present embodiment:

$$0.2 \leq s/L \leq 0.8 \quad (3).$$

Note that the distance L can be expressed as $R/2 \times \sin(\pi/N)$ when a diameter of a circumscribed circle of the polygon mirror 5 in the main scanning cross section is represented by R, and the number of the reflecting surfaces 5a in the polygon mirror 5 is represented by N.

When the ratio falls below the lower limit value in the conditional expression (3), it becomes difficult to change the physical film thickness of each layer along the longitudinal direction on the reflecting surface 5a so as to satisfy the conditional expression (2) when the polygon mirror 5 is mounted in the light scanning apparatus 100.

On the other hand, when the ratio exceeds the upper limit value in the conditional expression (3), it becomes difficult to provide a deflection point for deflecting the light flux to the BD sensor on the reflecting surface 5a when the polygon mirror 5 is mounted in the light scanning apparatus 100.

Further, it is preferred that the following conditional expression (3a) is satisfied in the polygon mirror 5 according to the present embodiment:

$$0.5 \leq s/L \leq 0.8 \quad (3a).$$

In the polygon mirror 5 according to the present embodiment, since R=20 mm and N=4, L is calculated as 7.1 mm. Further, since s=5.5 mm is obtained as shown in FIG. 6, s/L is calculated as 0.77, so that the conditional expression (3) is satisfied.

Figure 7:
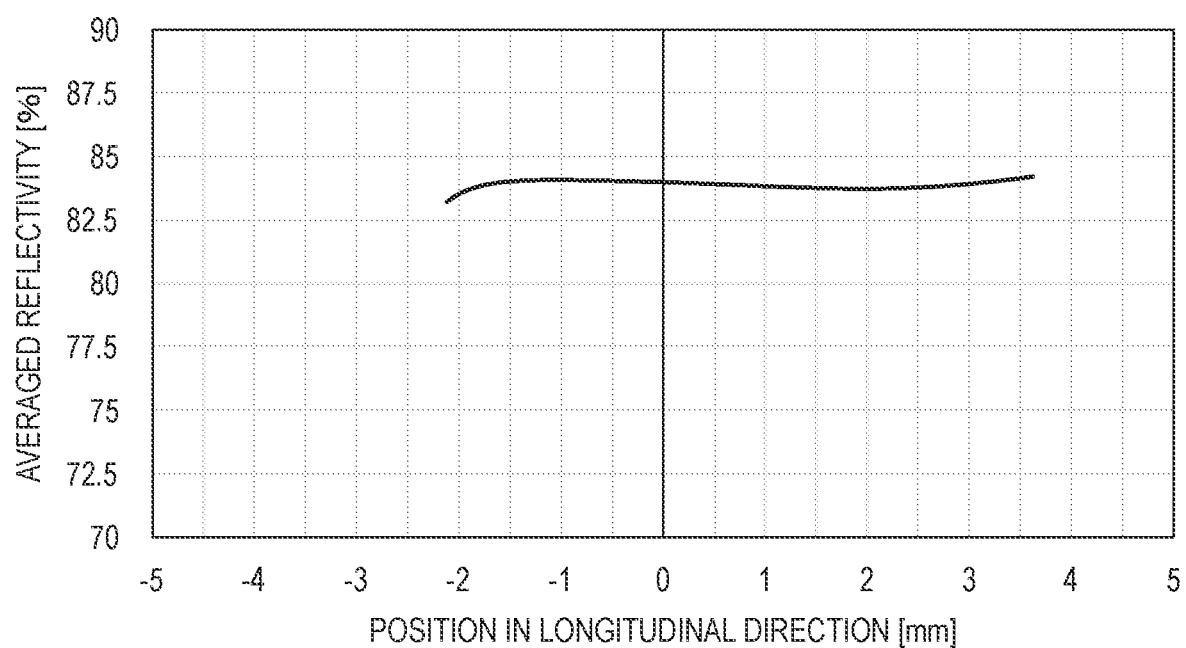
FIG. 7 is a graph showing averaged reflectivities with respect to the light fluxes which are incident at respective longitudinal positions on the reflecting surface of the polygon mirror according to the first embodiment of the present invention.

FIG. 7 shows an averaged reflectivity with respect to the light flux which is incident on each position in the longitudinal direction of the reflecting surface 5a in the light scanning apparatus 100 in which the polygon mirror 5 according to the present embodiment is mounted.

Here, the averaged reflectivity is a value obtained by averaging the reflectivities at respective positions included in the light flux width (see FIG. 6) with respect to the light fluxes which are incident on the respective positions of the reflecting surface 5a of the polygon mirror 5.

Further, the incident light flux herein is P-polarized and has a wavelength of 790 nm.

As described above, an incident position, an incident angle and a light flux width on the reflecting surface 5a of the polygon mirror 5 are different among the light fluxes deflected toward respective image printing positions on the scanned surface 7 in the light scanning apparatus 100 in which the polygon mirror 5 according to the present embodiment is mounted.

The reflectivity is changed by changing the physical film thickness of each layer of the multilayer film on the reflecting surface 5a of the polygon mirror 5 in accordance with the position in the longitudinal direction so as to cancel out such difference, thereby the averaged reflectivities at the respective positions of the reflecting surface 5a with respect to respective light fluxes are made substantially uniform among them.

In other words, a change in the reflectivity caused by a change in the incident angle of the light flux and a change in the reflectivity caused by a change in the incident position of the light flux cancel out each other between two predetermined reflection points on the reflecting surface 5a in the polygon mirror 5 according to the present embodiment.

Specifically, as shown in FIG. 7, the averaged reflectivity becomes substantially uniform between 83% and 84% at respective positions on the reflecting surface 5a of the polygon mirror 5 when the light fluxes are deflected toward an entire area between the outermost off-axis image height at the scanning start side and that at the scanning end side.

As described above, in the polygon mirror 5 according to the present embodiment, a film structure of the multilayer film on the reflecting surface 5a, specifically the physical film thickness of each layer of the multilayer film is set so as to change in the longitudinal direction such that the averaged reflectivities with respect to the light fluxes deflected toward respective image printing positions on the scanned surface 7 become substantially uniform when mounted in the light scanning apparatus 100.

Thereby, it is possible to obtain the polygon mirror 5 capable of achieving a high deflection performance capable of uniformizing a light amount distribution in the main scanning direction on the scanned surface 7 when mounted in the light scanning apparatus 100 at a low cost.

Second Embodiment

Next, the structure of the polygon mirror 5 according to a second embodiment of the present invention will be described. Since the polygon mirror 5 according to the present embodiment consists of the same members as those of the polygon mirror 5 according to the first embodiment, the same members are denoted by the same reference numerals, and description thereof is omitted.

As described below, there is a difference in the physical film thickness of each layer of the multilayer film on the reflecting surface 5a between the polygon mirror 5 according to the present embodiment and that according to the first embodiment.

Table 3 shows the physical film thickness of each layer of the multilayer film at the center of the reflecting surface 5a of the polygon mirror 5 according to the present embodiment.

In the multilayer film formed on the reflecting surface 5a of the polygon mirror 5 according to the present embodiment, a layer of the low refractive index material $SiO_2$ is provided between the substrate and the first layer as a ground layer (adhesion layer), but is omitted here.

TABLE 3

|  |  | Film material | Physical film thickness [nm] |
|---|---|---|---|
| Protecting layer | Fourth layer | $SiO_2$ | 177.23 |
| Reflecting layer | Third layer | $Ta_2O_5$ | 43.76 |
|  | Second layer | $SiO_2$ | 165.44 |
|  | First layer | Al | 100 |
|  | Substrate | K22R |  |

Further, Table 4 shows the physical film thickness of each layer of the multilayer film at the outermost off-axis reflection point on the reflecting surface 5a of the polygon mirror 5 according to the present embodiment.

TABLE 4

|  |  | Film material | Physical film thickness [nm] |
|---|---|---|---|
| Protecting layer | Fourth layer | $SiO_2$ | 160 |
| Reflecting layer | Third layer | $Ta_2O_5$ | 39 |

TABLE 4-continued

|  | Film material | Physical film thickness [nm] |
|---|---|---|
| Second layer | SiO$_2$ | 149 |
| First layer | Al | 90 |
| Substrate | K22R |  |

Specifically, as shown in Tables 3 and 4, respective physical film thicknesses of the third layer (high refractive index material Ta$_2$O$_5$), and the second layer and the fourth layer (low refractive index material SiO$_2$) on the reflecting surface 5a are changed in the polygon mirror 5 according to the present embodiment, in comparison with the polygon mirror 5 according to the first embodiment.

In particular, in the polygon mirror 5 according to the present embodiment, the physical film thickness of the third layer (high refractive index material Ta$_2$O$_5$) having a low film formation rate is made thinner than that in the polygon mirror 5 according to the first embodiment, thereby the film formation time is reduced to achieve a cost reduction.

Figure 8A:
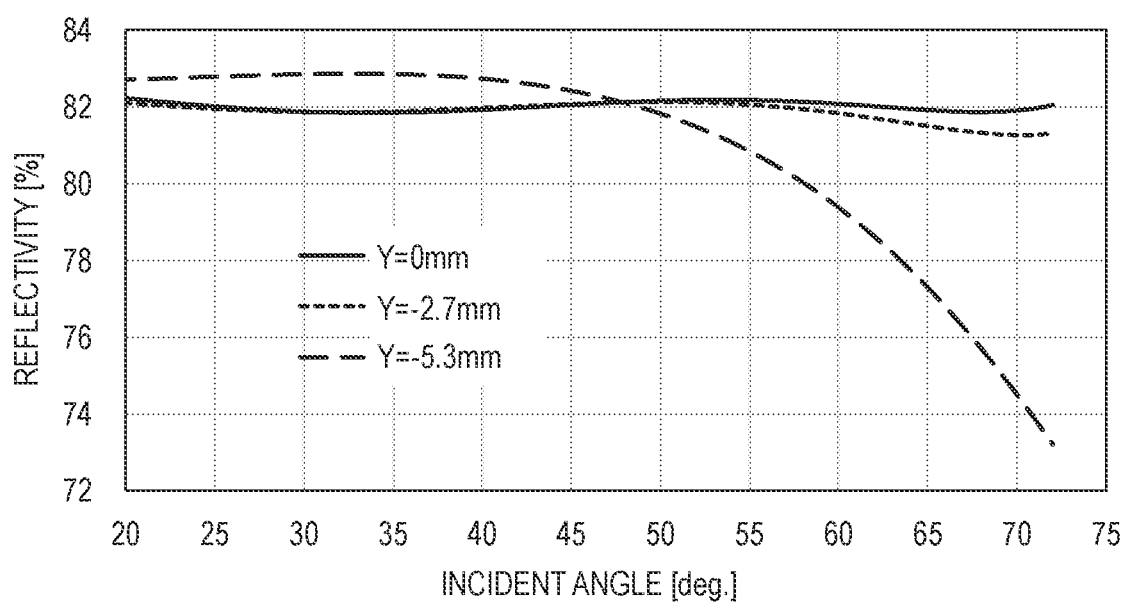
FIG. 8A is a graph showing an incident angle dependence of the reflectivity on the reflecting surface of the polygon mirror according to a second embodiment of the present invention.

FIG. 8A shows the incident angle dependence of the reflectivity on the reflecting surface 5a of the polygon mirror 5 according to the present embodiment.

Specifically, the incident angle dependence of the reflectivity is shown at Y=0 mm corresponding to the center of the reflecting surface 5a, Y=−5.3 mm corresponding to the outermost off-axis reflection point on the reflecting surface 5a and Y=−2.7 mm corresponding to an intermediate portion between them.

Further, the incident light flux herein is P-polarized and has a wavelength of 790 nm.

By setting the physical film thickness of each layer of the multilayer film on the reflecting surface 5a as shown in Tables 3 and 4 in the polygon mirror 5 according to the present embodiment, the incident angle dependence of the reflectivity can be made different between the center (Y=0 mm) and the outermost off-axis reflection point (Y=−5.3 mm) of the reflecting surface 5a as shown in FIG. 8A.

Figure 8B:
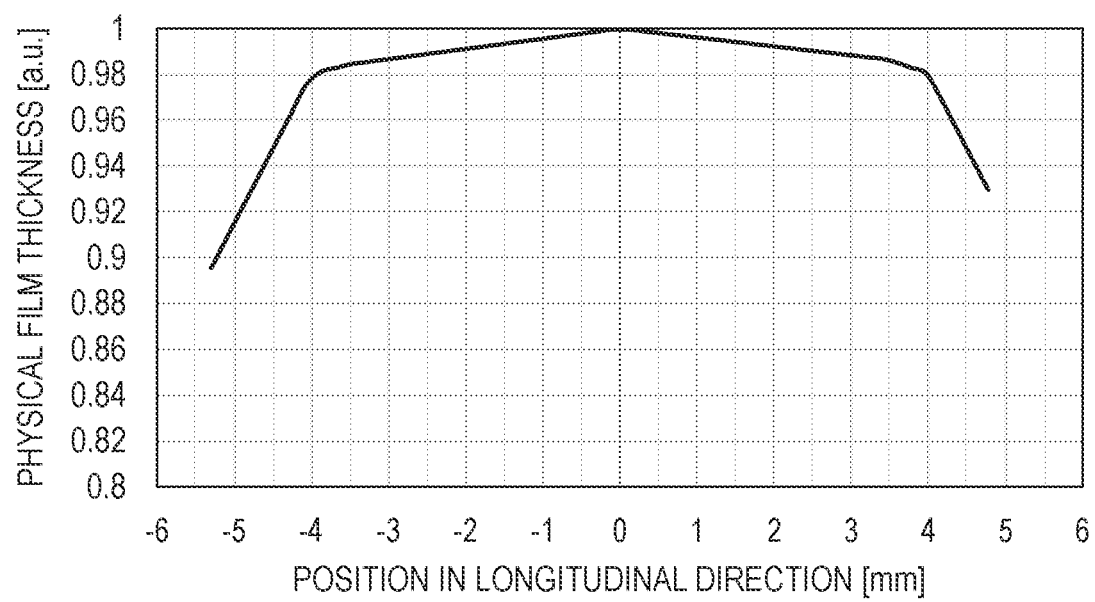
FIG. 8B is a graph showing a position dependence in the longitudinal direction of the physical film thickness on the reflecting surface of the polygon mirror according to the second embodiment of the present invention.

FIG. 8B shows a position dependence in the longitudinal direction of the physical film thickness of the multilayer film on the reflecting surface 5a of the polygon mirror 5 according to the present embodiment. In FIG. 8B, the physical film thickness of the multilayer film on the reflecting surface 5a is normalized such that the physical film thickness at the center (Y=0 mm) is 1.

Figure 8C:
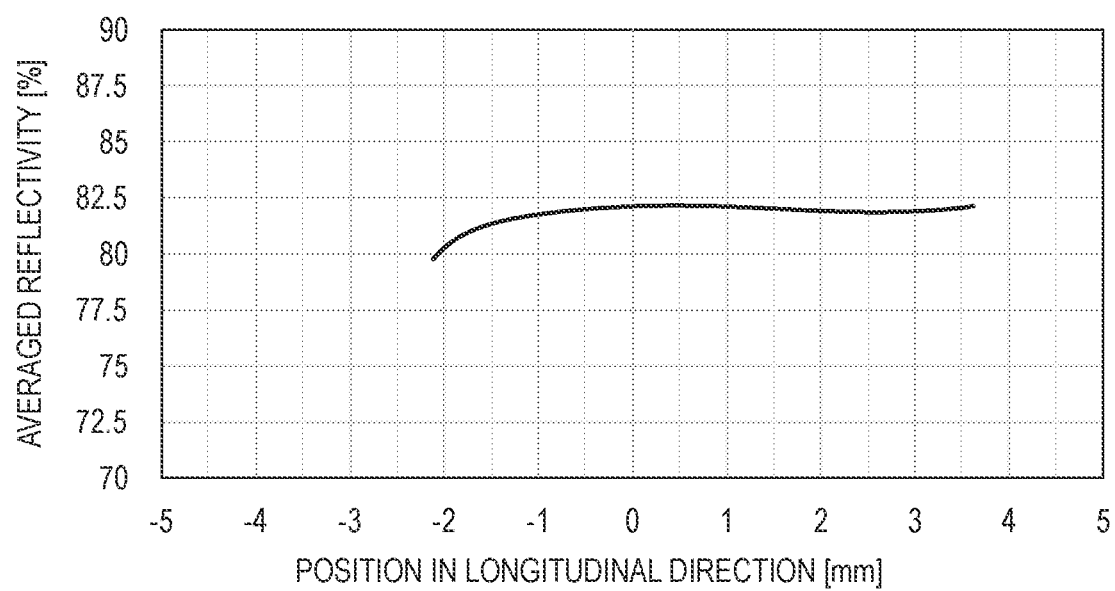
FIG. 8C is a graph showing a position dependence in the longitudinal direction of the averaged reflectivity on the reflecting surface of the polygon mirror according to the second embodiment of the present invention.

FIG. 8C shows the averaged reflectivities with respect to the light fluxes which are incident on respective positions of the reflecting surface 5a in the light scanning apparatus 100 in which the polygon mirror 5 according to the present embodiment is mounted.

As shown in FIG. 6, an incident position, an incident angle and a light flux width on the reflecting surface 5a of the polygon mirror 5 are different among the light fluxes deflected toward respective image printing positions on the scanned surface 7 in the light scanning apparatus 100 in which the polygon mirror 5 according to the present embodiment is mounted.

The reflectivity is changed by changing the physical film thickness of each layer of the multilayer film on the reflecting surface 5a of the polygon mirror 5 in accordance with the position in the longitudinal direction as shown in FIG. 8B so as to cancel out such difference, thereby the averaged reflectivities with respect to respective light fluxes on the reflecting surface 5a are made substantially uniform.

Specifically, as shown in FIG. 8C, the averaged reflectivities become substantially uniform between 79.5% and 82% at respective positions on the reflecting surface 5a of the polygon mirror 5 when the light fluxes are deflected toward an entire area between the outermost off-axis image height at the scanning start side and that at the scanning end side.

As can be seen from FIG. 8B, a position dependence in the longitudinal direction of the physical film thickness of the multilayer film is set such that the physical film thickness of the multilayer film is reduced by approximately 10% at the outermost off-axis reflection point (Y=−5.3 mm) compared with the center (Y=0 min), namely the physical film thickness of the multilayer film is reduced from the center toward the outermost off-axis reflection point in the polygon mirror 5 according to the present embodiment.

From Tables 3 and 4, the sum C of the physical film thicknesses of respective layers of the multilayer film at the center of the reflecting surface 5a and the sum D of the physical film thicknesses of the respective layers of the multilayer film at the outermost off-axis reflection point on the reflecting surface 5a are calculated as 486.4 nm and 438 nm, respectively.

Accordingly, since D/C=0.9 is obtained, the condition expression (1) is satisfied also in the polygon mirror 5 according to the present embodiment.

Further, as shown in FIG. 8A, the reflectivity with respect to the light flux which is incident on the reflecting surface 5a of the polygon mirror 5 at an incident angle of 70° becomes lower from the center toward the outermost off-axis reflection point in the light scanning apparatus 100 in which the polygon mirror 5 according to the present embodiment is mounted.

Then, the reflectivities A and B with respect to the light fluxes which are incident on the center and the outermost off-axis reflection point of the reflecting surface 5a of the polygon mirror 5 at the incidence angle of 70° are found to be 82% and 74.5%, respectively, so that |1−B/A| is calculated as 0.09, namely the conditional expression (2) is satisfied.

As described above, the film structure is designed such that the conditional expression (2) is satisfied with respect to the light flux which is incident on the reflecting surface 5a with the incident angle of 70°, P-polarized and the wavelength of 790 nm in the polygon mirror 5 according to the present embodiment.

However, the present invention is not limited to this, and the film structure may be designed such that the conditional expression (2) is satisfied also for the light flux which is incident on the reflecting surface 5a at the incident angle of 20° or 45°.

On the other hand, the polygon mirror 5 according to the present embodiment is configured such that the reflectivity with respect to the light flux which is incident on the reflecting surface 5a at the incidence angle of 35° becomes higher from the center toward the outermost off-axis reflection point.

That is, the difference in the reflectivity caused by the difference in the incident angle is canceled out by the difference in the reflectivity caused by the difference in the incident position between the light flux which is incident on the reflecting surface 5a at the incident angle of 45° and that at the incident angle of 20° or 70° in the polygon mirror 5 according to the present embodiment.

As a result, the reflectivity of the reflecting surface 5a can be made substantially uniform between the light flux which is incident on the reflecting surface 5a of the polygon mirror 5 at the incident angle of 45° so as to be deflected toward the image center on the scanned surface 7 and that at the incident angle of 20° or 70° so as to be deflected toward the image end on the scanned surface 7.

As described above, in the polygon mirror 5 according to the present embodiment, a film structure of the multilayer film on the reflecting surface 5a, specifically the physical film thickness of each layer of the multilayer film is set so as to change in the longitudinal direction such that the averaged reflectivities with respect to the light fluxes deflected toward respective image printing positions on the scanned surface 7 become substantially uniform when mounted in the light scanning apparatus 100.

Further, by making the physical film thickness of a layer with a low film formation rate thin, a film formation time for the layer is reduced.

Thereby, it is possible to obtain the polygon mirror 5 capable of achieving a high deflection performance capable of uniformizing a light amount distribution in the main scanning direction on the scanned surface 7 when mounted in the light scanning apparatus 100 at a further low cost.

Third Embodiment

Next, the structure of the polygon mirror 5 according to a third embodiment of the present invention will be described. Since the polygon mirror 5 according to the present embodiment consists of the same members as those of the polygon mirror 5 according to the first embodiment, the same members are denoted by the same reference numerals, and description thereof is omitted.

As described below, there is a difference in the physical film thickness of each layer of the multilayer film on the reflecting surface 5a between the polygon mirror 5 according to the present embodiment and that according to the first embodiment.

Table 5 shows the physical film thickness of each layer of the multilayer film at the center of the reflecting surface 5a of the polygon mirror 5 according to the present embodiment.

In the multilayer film formed on the reflecting surface 5a of the polygon mirror 5 according to the present embodiment, a layer of the low refractive index material $SiO_2$ is provided between the substrate and the first layer as a ground layer (adhesion layer), but is omitted here.

TABLE 5

| | | Film material | Physical film thickness [nm] |
|---|---|---|---|
| Protecting layer | Fourth layer | $SiO_2$ | 177.7 |
| Reflecting layer | Third layer | $Ta_2O_5$ | 58.9 |
| | Second layer | $SiO_2$ | 189.9 |
| | First layer | Al | 100.0 |
| | Substrate | K22R | |

Further, Table 6 shows the physical film thickness of each layer of the multilayer film at the outermost off-axis reflection point on the reflecting surface 5a of the polygon mirror 5 according to the present embodiment.

TABLE 6

| | | Film material | Physical film thickness [nm] |
|---|---|---|---|
| Protecting layer | Fourth layer | $SiO_2$ | 160 |
| Reflecting layer | Third layer | $Ta_2O_5$ | 53 |

TABLE 6-continued

| | Film material | Physical film thickness [nm] |
|---|---|---|
| Second layer | $SiO_2$ | 171 |
| First layer | Al | 90 |
| Substrate | K22R | |

Specifically, as shown in Tables 5 and 6, respective physical film thicknesses of the third layer (high refractive index material $Ta_2O_5$), and the second layer and the fourth layer (low refractive index material $SiO_2$) on the reflecting surface 5a are changed in the polygon mirror 5 according to the present embodiment, in comparison with the polygon mirror 5 according to the first embodiment.

In particular, in the polygon mirror 5 according to the present embodiment, the physical film thickness of the second layer and the fourth layer (low refractive index material $SiO_2$) is made thicker than that in the polygon mirror 5 according to the first embodiment in order to improve an environmental durability of the reflecting surface 5a, thereby a higher durability performance is achieved.

Figure 9A:
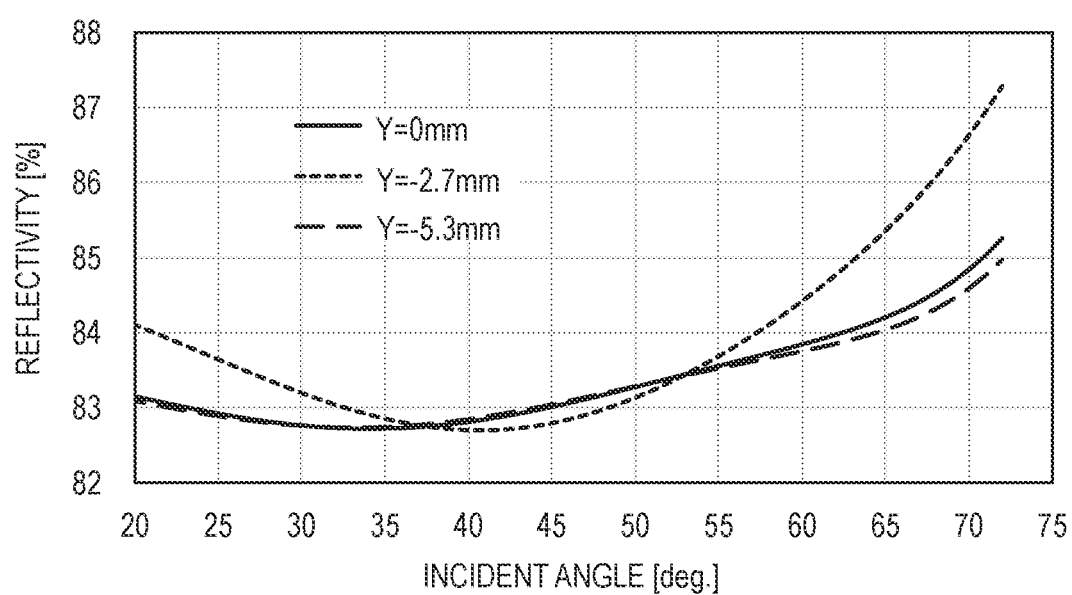
FIG. 9A is a graph showing an incident angle dependence of the reflectivity on the reflecting surface of the polygon mirror according to a third embodiment of the present invention.

FIG. 9A shows the incident angle dependence of the reflectivity on the reflecting surface 5a of the polygon mirror 5 according to the present embodiment.

Specifically, the incident angle dependence of the reflectivity is shown at Y=0 mm corresponding to the center of the reflecting surface 5a, Y=−5.3 mm corresponding to the outermost off-axis reflection point on the reflecting surface 5a, and Y=−2.7 mm corresponding to an intermediate portion between them.

Further, the incident light flux herein is P-polarized and has a wavelength of 790 nm.

By setting the physical film thickness of each layer of the multilayer film on the reflecting surface 5a as shown in Tables 5 and 6 in the polygon mirror 5 according to the present embodiment, the reflectivity can be made different between the center (Y=0 mm) and the outermost off-axis reflection point (Y=−5.3 mm) of the reflecting surface 5a as shown in FIG. 9A.

Figure 9B:
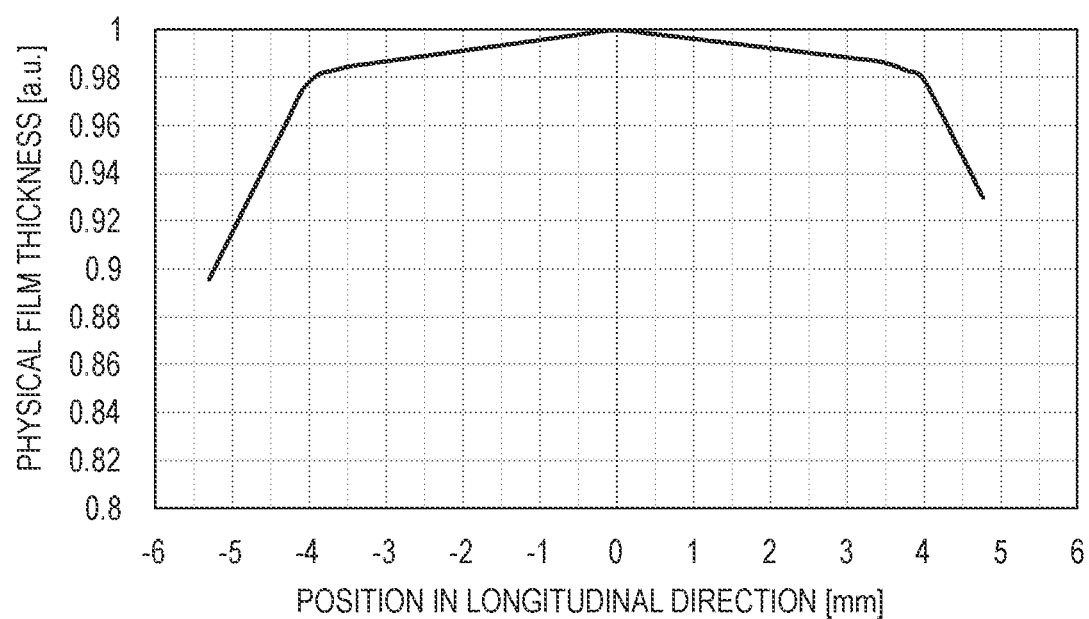
FIG. 9B is a graph showing a position dependence in the longitudinal direction of the physical film thickness on the reflecting surface of the polygon mirror according to the third embodiment of the present invention.

FIG. 9B shows a position dependence in the longitudinal direction of the physical film thickness of the multilayer film on the reflecting surface 5a of the polygon mirror 5 according to the present embodiment. In FIG. 9B, the physical film thickness of the multilayer film on the reflecting surface 5a is normalized such that the physical film thickness at the center (Y=0 mm) is 1.

Figure 9C:
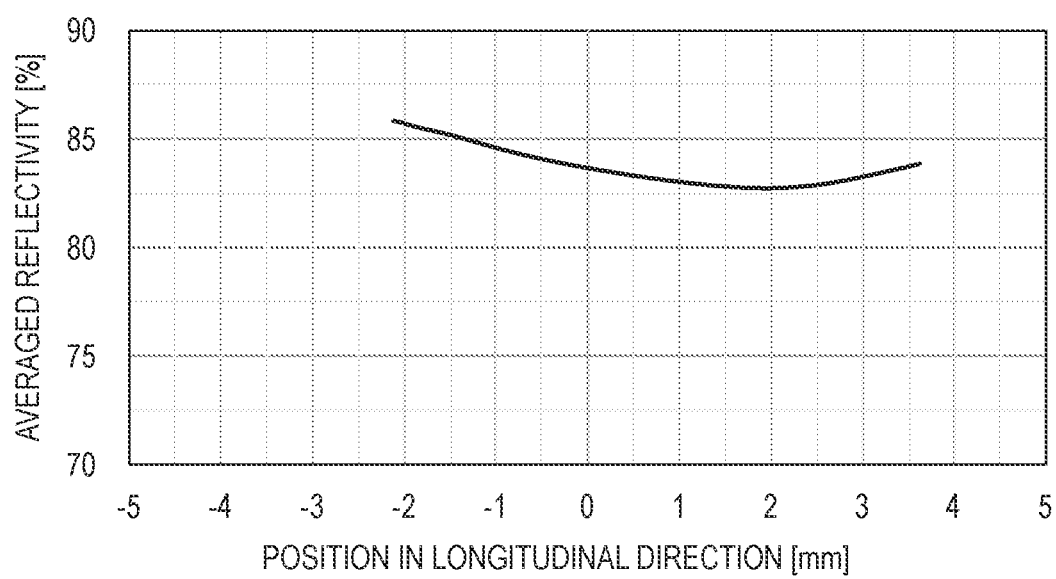
FIG. 9C is a graph showing a position dependence in the longitudinal direction of the averaged reflectivity on the reflecting surface of the polygon mirror according to the third embodiment of the present invention.

FIG. 9C shows the averaged reflectivities with respect to the light fluxes which are incident on respective positions of the reflecting surface 5a in the light scanning apparatus 100 in which the polygon mirror 5 according to the present embodiment is mounted.

As shown in FIG. 6, an incident position, an incident angle and a light flux width on the reflecting surface 5a of the polygon mirror 5 are different among the light fluxes deflected toward respective image printing positions on the scanned surface 7 in the light scanning apparatus 100 in which the polygon mirror 5 according to the present embodiment is mounted.

The reflectivity is changed by changing the physical film thickness of each layer of the multilayer film on the reflecting surface 5a of the polygon mirror 5 in accordance with the position in the longitudinal direction as shown in FIG. 9B so as to cancel out such difference, thereby the averaged reflectivities with respect to respective light fluxes on the reflecting surface 5a are made substantially uniform.

Specifically, as shown in FIG. 9C, the averaged reflectivities become substantially uniform between 82.8% and 86% at respective reflection points on the reflecting surface 5a of the polygon mirror 5 when the light fluxes are deflected toward an entire area between the outermost off-axis image height at the scanning start side and that at the scanning end side.

As can be seen from FIG. 9B, a position dependence in the longitudinal direction of the physical film thickness of the multilayer film is set such that the physical film thickness of the multilayer film is reduced by approximately 10% at the outermost off-axis reflection point (Y=−5.3 mm) compared with the center (Y=0 mm), namely the physical film thickness of the multilayer film is reduced from the center toward the outermost off-axis reflection point in the polygon mirror 5 according to the present embodiment.

From Tables 5 and 6, the sum C of the physical film thicknesses of respective layers of the multilayer film at the center of the reflecting surface 5a and the sum D of the physical film thicknesses of the respective layers of the multilayer film at the outermost off-axis reflection point on the reflecting surface 5a are calculated as 526.5 nm and 474 nm, respectively.

Accordingly, since D/C=0.9 is obtained, the condition expression (1) is satisfied also in the polygon mirror 5 according to the present embodiment.

Further, as shown in FIG. 9A, the reflectivity with respect to the light flux which is incident on the reflecting surface 5a of the polygon mirror 5 at an incident angle of 70° becomes higher from the center (Y=0 mm) toward the intermediate portion (Y=−2.7 mm) along the longitudinal direction in the light scanning apparatus 100 in which the polygon mirror 5 according to the present embodiment is mounted.

Then, the reflectivities A and B with respect to the light fluxes which are incident on the center (Y=0 mm) and the intermediate portion (Y=−2.7 mm) of the reflecting surface 5a of the polygon mirror 5 at the incidence angle of 70° are found to be 84.6% and 86.6%, respectively, so that |1−B/A| is calculated as 0.024, namely the conditional expression (2) is satisfied.

As described above, the film structure is designed such that the conditional expression (2) is satisfied with respect to the light flux which is incident on the reflecting surface 5a with the incident angle of 70°, P-polarized and the wavelength of 790 nm in the polygon mirror 5 according to the present embodiment.

However, the present invention is not limited to this, and the film structure may be designed such that the conditional expression (2) is satisfied also for the light flux which is incident on the reflecting surface 5a at the incident angle of 20° or 45°.

The polygon mirror 5 according to the present embodiment is configured such that the reflectivity with respect to the light flux which is incident on the reflecting surface 5a at the incidence angle of 70° becomes higher from the center toward the intermediate portion, and then lower from the intermediate portion toward the outermost off-axis reflection point, along the longitudinal direction.

That is, light amounts at respective image printing positions on the scanned surface 7 can be made substantially uniform by reducing a difference between respective incidence angle dependences of the reflectivity at the center and the outermost off-axis reflection point of the reflecting surface 5a in the polygon mirror 5 according to the present embodiment.

As described above, in the polygon mirror 5 according to the present embodiment, a film structure of the multilayer film on the reflecting surface 5a, specifically the physical film thickness of each layer of the multilayer film is set so as to change in the longitudinal direction such that the averaged reflectivities with respect to the light fluxes deflected toward the respective image printing positions on the scanned surface 7 become substantially uniform when mounted in the light scanning apparatus 100.

Further, the physical film thickness of a layer contributing to the environmental durability, specifically the second layer and the fourth layer (low refractive index material $SiO_2$) is made thick.

Thereby, it is possible to obtain the polygon mirror 5 having a high deflection performance capable of uniformizing a light amount distribution in the main scanning direction on the scanned surface 7 when mounted in the light scanning apparatus 100 and achieving the higher durability performance.

According to the present invention, it is possible to provide the polygon mirror which can reduce the light amount difference among respective image heights on the scanned surface with suppressing the increase in size in the light scanning apparatus.

Monochrome Image Forming Apparatus

Figure 10A:
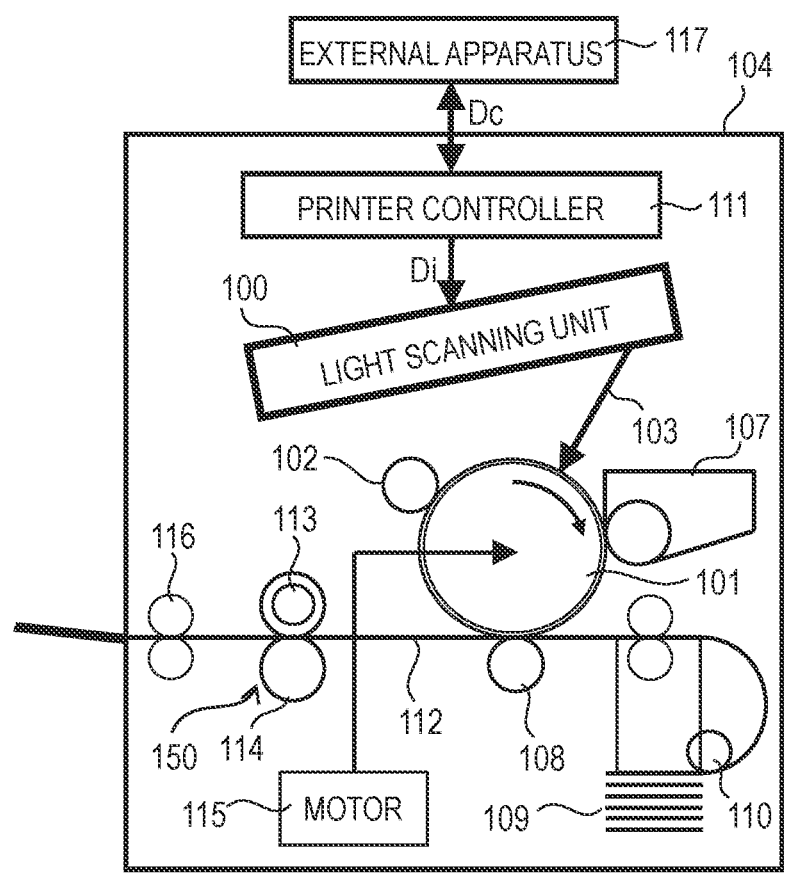
FIG. 10A is a sub-scanning cross sectional view of a main portion of a monochrome image forming apparatus according to the present invention.

FIG. 10A shows a sub-scanning cross sectional view of a main part of a monochrome image forming apparatus 104 including the light scanning unit 100 with the polygon mirror 5 according to any one of the first to third embodiments of the present invention.

Code data Dc is input to the monochrome image forming apparatus 104 from an external apparatus 117, such as a personal computer. The input code data Dc is converted into image data (dot data) Di by a printer controller 111 in the image forming apparatus 104. The converted image data Di is input to the light scanning unit 100. A light beam 103 modulated in accordance with the image data Di is emitted from the light scanning unit 100, and a photosensitive surface of a photosensitive drum 101 is scanned in the main scanning direction by the light beam 103.

The photosensitive drum 101 serving as an electrostatic latent image carrier (photosensitive body) is rotated clockwise by a motor 115. With this rotation, the photosensitive surface of the photosensitive drum 101 moves in the sub-scanning direction perpendicular to the main scanning direction with respect to the light beam 103. A charging roller 102 for uniformly charging the surface of the photosensitive drum 101 is provided above the photosensitive drum 101 so as to abut on the surface. The surface of the photosensitive drum 101 charged by the charging roller 102 is irradiated with the light beam 103 scanned by the light scanning unit 100.

As described above, the light beam 103 is modulated based on the image data Di, and an electrostatic latent image is formed on the surface of the photosensitive drum 101 by irradiating the light beam 103. The formed electrostatic latent image is developed as a toner image by a developing unit 107 arranged on a further downstream side in the rotational direction of the irradiated position of the light beam 103 on the photosensitive drum 101 so as to abut on the photosensitive drum 101.

The toner image developed by the developing unit 107 is transferred onto a sheet 112 as a transferred material by a transferring roller 108 (transferring unit) arranged below the photosensitive drum 101 so as to face the photosensitive drum 101. Although the sheet 112 is stored in a sheet cassette 109 in front of the photosensitive drum 101 (right side in FIG. 10A), the sheet 112 can be manually fed. A sheet feeding roller 110 is arranged at an end portion of the sheet cassette 109, and the sheet 112 in the sheet cassette 109 is fed to a conveying path.

The sheet 112 onto which the unfixed toner image has been transferred as described above is conveyed to a fixing unit 150 arranged behind the photosensitive drum 101 (left side in FIG. 10A). The fixing unit 150 is formed by a fixing roller 113 having a fixing heater (not shown) therein, and a pressing roller 114 arranged so as to press against the fixing roller 113. The unfixed toner image on the sheet 112 is fixed by heating the sheet 112 conveyed from the transferring roller 108 with pressing the sheet 112 by a pressing portion between the fixing roller 113 and the pressing roller 114. Further, a discharging roller 116 is arranged behind the fixing unit 150, and the fixed sheet 112 is discharged to an outside of the monochrome image forming apparatus 104.

Note that the printer controller 111 controls each unit in the monochrome image forming apparatus 104 such as the motor 115, and a polygon motor in the light scanning unit 100 or the like in addition to the above-described data conversion.

Color Image Forming Apparatus

Figure 10B:
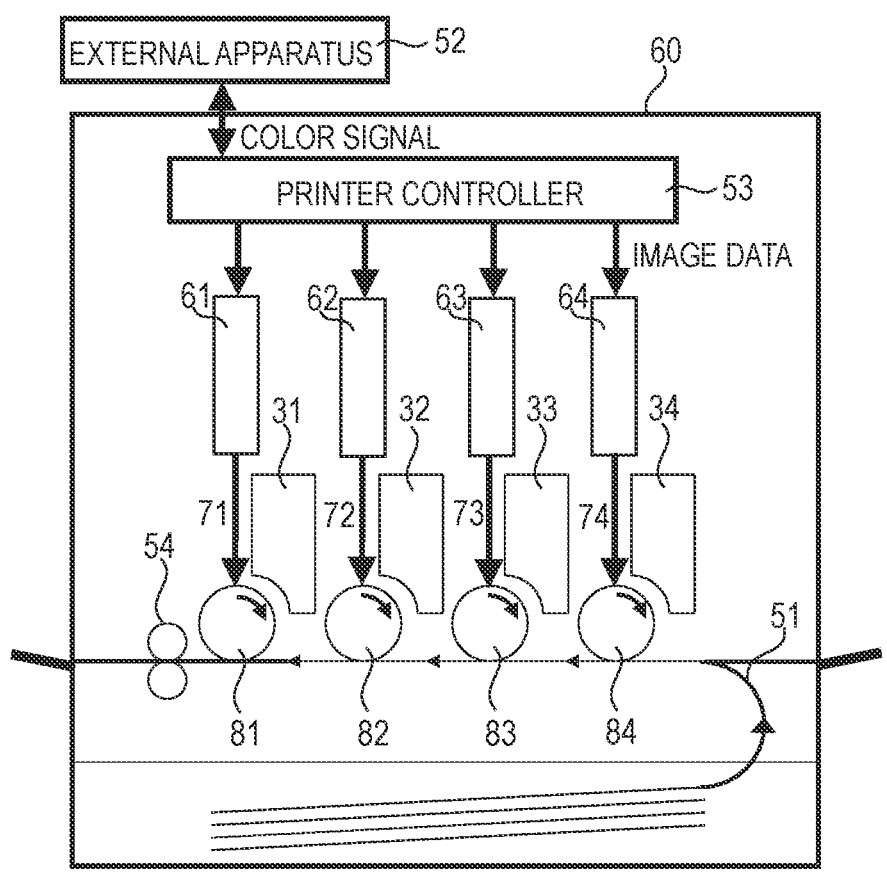
FIG. 10B is a sub-scanning cross sectional view of a main portion of a color image forming apparatus according to the present invention.

FIG. 10B shows a sub-scanning cross sectional view of a main part of an image forming apparatus 60 including the light scanning apparatuses 61 to 64 with the polygon mirror 5 according to any one of the first to third embodiments of the present invention.

The image forming apparatus 60 is a tandem type color image forming apparatus in which each of four light scanning apparatuses records image information on a photosensitive drum surface as an image carrier in parallel.

The image forming apparatus 60 includes light scanning apparatuses 61, 62, 63 and 64 including the polygon mirror 5 according to any one of the first to third embodiments of the present invention, and photosensitive drums 81, 82, 83 and 84 as image carriers.

Further, the image forming apparatus 60 includes developing units 31, 32, 33 and 34, a conveying belt 51, a printer controller 53, and a fixing unit 54.

R (red), G (green) and B (blue) color signals (code data) are input to the image forming apparatus 60 from an external apparatus 52, such as a personal computer. The input color signals are converted into image data of C (cyan), M (magenta), Y (Yellow) and K (black) by the printer controller 53 in the apparatus. The converted image data are input to the light scanning apparatuses 61, 62, 63 and 64 as the image signal and the image information. Then, light fluxes 71, 72, 73 and 74 modulated in accordance with the respective image data are emitted from the light scanning apparatuses 61, 62, 63 and 64. Photosensitive surfaces of the photosensitive drums 81, 82, 83 and 84 are scanned in the main scanning direction by these light fluxes.

In the image forming apparatus 60, for example, the image signal of C (cyan) is inputted to the light scanning apparatus 61, the image signal of M (magenta) is inputted to the light scanning apparatus 62, the image signal of Y (yellow) is inputted to the light scanning apparatus 63, and the image signal of K (black) is inputted to the light scanning apparatus 64. Then, they record the image signals in parallel on the photosensitive surfaces of the photosensitive drums 81, 82, 83 and 84, respectively, and a color image is printed at high speed.

As described above, an electrostatic latent image of each color is formed on the photosensitive surface of corresponding one of the photosensitive drums 81, 82, 83 and 84 by using the light fluxes based on each image data from the four light scanning apparatuses 61, 62, 63 and 64 in the image firming apparatus 60.

After that, the electrostatic latent images of respective colors are developed into respective color toner images by the developing units 31, 32, 33 and 34, and the developed respective color toner images are multiply transferred by transferring unit to the transferred material conveyed by the conveying belt 51. Then, the transferred toner images are fixed by the fixing unit 54 to form a full color image.

As the external apparatus 52, for example, a color image reading apparatus including a charge coupled device (CCD) sensor may be used. In this case, a color digital copier is formed by this color image reading apparatus and the image forming apparatus 60.

Further, the image forming apparatus 60 is not limited to the structure including the four light scanning apparatus and the four photosensitive drums. For example, only one light scanning apparatus and only one photosensitive drum may be provided. In addition, the number of the light scanning apparatuses and the photosensitive drums may be two, three, or five or more, respectively.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-008460, filed Jan. 22, 2021, which is hereby incorporated by reference herein in its entirety.

What is claimed is:

1. A polygon mirror comprising:
   a plurality of reflecting surfaces each of which is rectangular,
   wherein each of the plurality of reflecting surfaces includes a substrate made of a resin material and a multilayer film formed on the substrate, and
   wherein a following inequality is satisfied:

$$0.02 < |1 - B/A| < 0.10$$

where A represents a reflectivity at a center of each of the plurality of reflecting surfaces with respect to a light flux which is incident at a predetermined incident angle, and B represents the reflectivity at a predetermined point between the center and an end in a longitudinal direction of each of the plurality of reflecting surfaces with respect to the light flux which is incident at the predetermined incident angle.

2. The polygon mirror according to claim 1, wherein the reflectivity of each of the plurality of reflecting surfaces with respect to the light flux which is incident at the predetermined incident angle becomes lower from the center toward the predetermined point along the longitudinal direction.

3. The polygon mirror according to claim 1,
   wherein the reflectivity of each of the plurality of reflecting surfaces with respect to the light flux which is incident at a first incident angle becomes lower from the center toward the predetermined point along the longitudinal direction, and
   wherein the reflectivity of each of the plurality of reflecting surfaces with respect to the light flux which is incident at a second incident angle becomes higher from the center toward the predetermined point along the longitudinal direction.

4. The polygon mirror according to claim 1, wherein a change in the reflectivity from the center toward one end in the longitudinal direction is identical to the change in the reflectivity from the center toward the other end in the longitudinal direction.

5. The polygon mirror according to claim 1, wherein a physical film thickness of the multilayer film becomes thinner from the center toward the predetermined point along the longitudinal direction.

6. The polygon mirror according to claim 1, wherein a change in the reflectivity caused by a change in the incident angle of the light flux and the change in the reflectivity caused by a change in an incident position of the light flux cancel out each other between two predetermined reflection points on each of the plurality of reflecting surfaces.

7. The polygon mirror according to claim 1, wherein a following condition inequality is satisfied:

$$0.2 \leq s/L \leq 0.8$$

where L represents a distance between the center and the end of each of the plurality of reflecting surfaces, and s represents a distance between the center and the predetermined point of each of the plurality of reflecting surfaces.

8. A deflecting apparatus comprising:
the polygon mirror according to claim 1; and
a driving unit for rotating the polygon mirror.

9. A light scanning apparatus comprising:
the polygon mirror according to claim 1; and
an optical system for guiding the light flux deflected by the polygon mirror to a scanned surface.

10. The light scanning apparatus according to claim 9, wherein the predetermined point is a reflection point of a marginal ray of an outermost off-axis light flux most distant from the center in the longitudinal direction.

11. The light scanning apparatus according to claim 9, wherein a change in the reflectivity caused by a change in the incident angle of the light flux and the change in the reflectivity caused by a change in an incident position of the light flux cancel out each other between two predetermined reflection points on each of the plurality of reflecting surfaces.

12. An image forming apparatus comprising:
the light scanning apparatus according to claim 11;
a developing unit for developing, as a toner image, an electrostatic latent image formed on the scanned surface by the light scanning apparatus;
a transferring unit for transferring the developed toner image onto a transferred material; and
a fixing unit for fixing the transferred toner image on the transferred material.

13. An image forming apparatus comprising:
the light scanning apparatus according to claim 9; and
a printer controller for converting a signal output from an external apparatus into image data to input the image data to the light scanning apparatus.

14. The polygon mirror according to claim 1, wherein the multilayer film includes a layer formed of a metal material.

15. The polygon mirror according to claim 1, wherein the multilayer film includes a reflecting layer formed of a plurality of layers and a protecting layer provided on the reflecting layer.

16. The polygon mirror according to claim 15, wherein the multilayer film includes a ground layer provided between the substrate and the reflecting layer.

17. The polygon mirror according to claim 1, wherein an uppermost layer farthest from the substrate has a lowest reflectivity, whereas a layer adjacent to the uppermost layer has a highest reflectivity in the multilayer film.

18. The polygon mirror according to claim 1, wherein the multilayer film has a first layer including Al, a second layer including $SiO_2$, a third layer including $Ta_2O_5$, and a fourth layer including $SiO_2$ provided in order from a substrate side.

19. The polygon mirror according to claim 1, wherein a following inequality is satisfied:

$$0.50 < D/C < 0.98$$

where C and D represent a physical film thickness of the multilayer film at the center of each of the plurality of reflecting surfaces and at the predetermined point of each of the plurality of reflecting surfaces, respectively.

20. A polygon mirror comprising:
a plurality of reflecting surfaces each of which is rectangular,
wherein following inequalities are satisfied:

$$0.02 < |1-B/A| < 0.10, \text{ and}$$

$$0.2 \leq s/L \leq 0.8$$

where A represents a reflectivity at a center of each of the plurality of reflecting surfaces with respect to a light flux which is incident at a predetermined incident angle, B represents the reflectivity at a predetermined point between the center and an end in a longitudinal direction of each of the plurality of reflecting surfaces with respect to the light flux which is incident at the predetermined incident angle, L represents a distance between the center and the end of each of the plurality of reflecting surfaces, and s represents a distance between the center and the predetermined point of each of the plurality of reflecting surfaces.

21. A light scanning apparatus comprising:
a polygon mirror including a plurality of reflecting surfaces each of which is rectangular; and
an optical system for guiding the light flux deflected by the polygon mirror to a scanned surface,
wherein a following inequality is satisfied:

$$0.02 < |1-B/A| < 0.10$$

where A represents a reflectivity at a center of each of the plurality of reflecting surfaces with respect to a light flux which is incident at a predetermined incident angle, and B represents the reflectivity at a predetermined point between the center and an end in a longitudinal direction of each of the plurality of reflecting surfaces with respect to the light flux which is incident at the predetermined incident angle, and
wherein the predetermined point is a reflection point of a marginal ray of an outermost off-axis light flux most distant from the center in the longitudinal direction.

* * * * *